(12) United States Patent
To et al.

(10) Patent No.: US 12,700,896 B2
(45) Date of Patent: Aug. 4, 2026

(54) TRANSMITTED PRECODING MATRIX INDICATOR (TPMI) DETERMINATION FOR NEW RADIO (NR) FREQUENCY RANGE 1 (FR1) SINGLE USER (SU) MULTIPLE INPUT MULTIPLE OUTPUT (MIMO) IN AN UPLINK

(71) Applicant: RAKUTEN SYMPHONY, INC., Tokyo (JP)

(72) Inventors: Duc To, Surrey (GB); Vihang Kamble, Surrey (GB); Raghavendra Madanahally Ramakrishna, Bangalore (IN); Ronak Bharatkumar Lalwala, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 12 days.

(21) Appl. No.: 18/496,786

(22) Filed: Oct. 27, 2023

(65) Prior Publication Data

US 2025/0141503 A1 May 1, 2025

(51) Int. Cl.
*H04B 7/0456* (2017.01)

(52) U.S. Cl.
CPC .................................. *H04B 7/0465* (2013.01)

(58) Field of Classification Search
CPC .................................................... H04B 7/0465
See application file for complete search history.

(56) References Cited

U.S. PATENT DOCUMENTS

| | | | | |
|---|---|---|---|---|
| 7,627,051 | B2 * | 12/2009 | Shen | H04B 7/0634 375/267 |
| 9,042,928 | B2 * | 5/2015 | Park | H04L 5/0057 455/67.11 |
| 9,883,514 | B2 * | 1/2018 | Park | H04L 5/0057 |
| 10,517,082 | B2 * | 12/2019 | Baligh | H04B 7/024 |
| 11,363,466 | B2 * | 6/2022 | Khalid | H04B 7/0608 |
| 11,387,881 | B2 * | 7/2022 | Cheraghi | H04B 7/0626 |
| 11,418,238 | B2 * | 8/2022 | Manolakos | H04B 7/0695 |
| 11,588,523 | B2 * | 2/2023 | Khoshnevisan | H04L 5/0048 |
| 11,658,704 | B2 * | 5/2023 | Raghavan | H04B 7/0628 370/328 |
| 11,917,442 | B2 * | 2/2024 | Elshafie | H04L 1/1896 |
| 11,943,632 | B2 * | 3/2024 | Khalid | H04W 16/28 |
| 12,088,372 | B2 * | 9/2024 | Pelur Sukumar | H04L 5/0482 |
| 12,166,544 | B2 * | 12/2024 | Ramakrishna | H04B 17/345 |
| 12,432,025 | B2 * | 9/2025 | Levitsky | H04L 5/0094 |

(Continued)

FOREIGN PATENT DOCUMENTS

| | | | | | |
|---|---|---|---|---|---|
| AU | 2012310465 | A1 * | 3/2014 | ........... | H04W 72/54 |
| AU | 2012310465 | B2 * | 9/2016 | ........... | H04W 72/54 |

(Continued)

*Primary Examiner* — Berhanu Tadese
(74) *Attorney, Agent, or Firm* — HAUPTMAN HAM, LLP

(57) ABSTRACT

A precoder index is derived from a precoder codebook using a low computationally complex process. A plurality of uplink channel matrix estimates are received at a Base Station (BS) from a User Equipment (UE). The plurality of uplink channel matrix estimates are processed to determine an indicator of the precoder having a highest spectral efficiency estimate. The indicator of the precoder having the highest spectral efficiency estimate is selected for transmission by the BS.

20 Claims, 14 Drawing Sheets

(56) References Cited

U.S. PATENT DOCUMENTS

| | | | | |
|---|---|---|---|---|
| 2006/0098760 A1* | 5/2006 | Shen | | H04B 7/0697 |
| | | | | 375/299 |
| 2012/0087335 A1* | 4/2012 | Baligh | | H04L 1/0625 |
| | | | | 370/330 |
| 2013/0016662 A1* | 1/2013 | Baligh | | H04L 1/0071 |
| | | | | 370/328 |
| 2013/0083863 A1* | 4/2013 | Gupta | | H04B 7/0478 |
| | | | | 375/267 |
| 2017/0289984 A1* | 10/2017 | Baligh | | H04L 1/08 |
| 2021/0297133 A1* | 9/2021 | Cheraghi | | H04B 7/066 |
| 2022/0095146 A1* | 3/2022 | Elshafie | | H04L 1/002 |
| 2022/0217566 A1* | 7/2022 | Leather | | H04B 7/0417 |
| 2022/0329308 A1* | 10/2022 | Huang | | H04B 7/0456 |
| 2022/0368398 A1* | 11/2022 | Raghothaman | | H04B 7/0639 |
| 2022/0368485 A1* | 11/2022 | Levitsky | | H04L 5/0094 |
| 2023/0155864 A1* | 5/2023 | Abdoli | | H04L 25/0204 |
| | | | | 370/329 |
| 2023/0344600 A1* | 10/2023 | Levitsky | | H04L 1/0026 |
| 2023/0387990 A1* | 11/2023 | Ibrahim | | H04B 17/336 |
| 2023/0387996 A1* | 11/2023 | Leather | | H04W 72/51 |
| 2024/0023178 A1* | 1/2024 | Svendsen | | H04W 24/08 |
| 2024/0049150 A1* | 2/2024 | Yang | | H04W 52/42 |
| 2024/0088956 A1* | 3/2024 | Pelur Sukumar | | H04B 17/327 |
| 2024/0187906 A1* | 6/2024 | Elshafie | | H04L 1/1819 |
| 2024/0250769 A1* | 7/2024 | Bala | | H04B 10/548 |
| 2024/0267173 A1* | 8/2024 | Paz | | H04B 7/0696 |
| 2024/0380450 A1* | 11/2024 | Ibrahim | | H04B 7/0695 |
| 2025/0141503 A1* | 5/2025 | To | | H04B 7/0465 |
| 2026/0012308 A1* | 1/2026 | Levitsky | | H04L 5/0048 |

FOREIGN PATENT DOCUMENTS

| | | | | | |
|---|---|---|---|---|---|
| CA | 2848640 | A1 | * | 3/2013 | H04W 72/54 |
| CA | 2848640 | C | * | 8/2019 | H04W 72/54 |
| CN | 1795619 | A | * | 6/2006 | H04L 25/025 |
| CN | 100399716 | C | * | 7/2008 | H04L 25/0242 |
| CN | 102629105 | A | * | 8/2012 | |
| CN | 104380649 | A | * | 2/2015 | H04J 11/0053 |
| CN | 104756427 | A | * | 7/2015 | H04B 7/0456 |
| CN | 104730517 | B | * | 1/2017 | G01S 13/66 |
| CN | 106373157 | A | * | 2/2017 | |
| CN | 104380649 | B | * | 7/2017 | H04L 1/00 |
| CN | 106936485 | A | * | 7/2017 | H04B 7/0456 |
| CN | 104380649 | B9 | * | 8/2017 | H04L 1/0028 |
| CN | 107171709 | A | * | 9/2017 | H04B 7/0456 |
| CN | 107317646 | A | * | 11/2017 | H04L 1/00 |
| CN | 104756427 | B | * | 5/2018 | H04B 7/0456 |
| CN | 103828255 | B | * | 6/2018 | H04W 72/54 |
| CN | 105069406 | B | * | 6/2018 | G06V 40/161 |
| CN | 108494456 | A | * | 9/2018 | H04B 7/0456 |
| CN | 108781448 | A | * | 11/2018 | H04W 72/20 |
| CN | 107317646 | B | * | 10/2019 | H04L 1/0028 |
| CN | 105957536 | B | * | 11/2019 | G10L 21/0232 |
| CN | 110943768 | A | * | 3/2020 | H04B 7/0456 |
| CN | 107248875 | B | * | 4/2020 | H04B 7/046 |
| CN | 111092641 | A | * | 5/2020 | G06N 3/045 |
| CN | 106936485 | B | * | 6/2020 | H04B 7/0456 |
| CN | 110943768 | B | * | 9/2021 | H04B 7/0456 |
| CN | 111092641 | B | * | 2/2022 | G06N 3/045 |
| CN | 114557005 | A | * | 5/2022 | H04W 4/70 |
| CN | 116073867 | A | * | 5/2023 | H04B 7/0456 |
| CN | 117242880 | A | * | 12/2023 | H04B 17/336 |
| CN | 118715760 | A | * | 9/2024 | H04J 14/0298 |
| CN | 119138086 | A | * | 12/2024 | H04W 74/0833 |
| CN | 119234456 | A | * | 12/2024 | G01S 7/006 |
| EA | 036666 | B1 | * | 12/2020 | H04W 72/23 |
| EP | 1919097 | A1 | * | 5/2008 | H04B 7/065 |
| EP | 3430853 | B1 | * | 8/2020 | H04W 72/20 |
| EP | 4152639 | A1 | * | 3/2023 | H04L 25/0204 |
| EP | 4307574 | A1 | * | 1/2024 | H04B 7/088 |
| ES | 2887048 | T3 | * | 12/2021 | H04W 72/23 |
| JP | 2021193796 | A | * | 12/2021 | H04W 72/23 |
| KR | 20130030404 | A | * | 3/2013 | H04W 72/54 |
| KR | 20170137074 | A | * | 12/2017 | H04W 72/23 |
| KR | 20220021835 | A | * | 2/2022 | H04L 1/0016 |
| KR | 20220050597 | A | * | 4/2022 | H04W 72/542 |
| KR | 20220065767 | A | * | 5/2022 | H04W 4/70 |
| KR | 20230157966 | A | * | 11/2023 | H04B 17/336 |
| KR | 20240050323 | A | * | 4/2024 | H04B 17/328 |
| KR | 20240127457 | A | * | 8/2024 | H04J 14/0298 |
| TW | 202030995 | A | * | 8/2020 | H04L 5/0051 |
| TW | 202110109 | A | * | 3/2021 | H04B 7/0452 |
| TW | I747578 | B | * | 11/2021 | H04B 7/0452 |
| TW | 202205823 | A | * | 2/2022 | H04B 7/0452 |
| TW | 202224362 | A | * | 6/2022 | H04L 5/0051 |
| TW | 202329649 | A | * | 7/2023 | H04B 7/0452 |
| TW | 202406313 | A | * | 2/2024 | H04W 72/1273 |
| WO | WO-2013042922 | A2 | * | 3/2013 | H04W 72/54 |
| WO | WO-2015039294 | A1 | * | 3/2015 | H04B 7/0456 |
| WO | WO-2016067318 | A1 | * | 5/2016 | H04B 7/0452 |
| WO | WO-2020253585 | A1 | * | 12/2020 | H04W 72/23 |
| WO | WO-2021028318 | A1 | * | 2/2021 | H04W 4/70 |
| WO | WO-2021146060 | A1 | * | 7/2021 | H04W 72/23 |
| WO | WO-2022035297 | A1 | * | 2/2022 | H04L 1/20 |
| WO | WO-2022171806 | A2 | * | 8/2022 | H04B 17/336 |
| WO | WO-2022241340 | A1 | * | 11/2022 | H04B 7/01 |
| WO | WO-2023087203 | A1 | * | 5/2023 | H04B 7/0456 |
| WO | WO-2023203467 | A1 | * | 10/2023 | H04B 7/0639 |
| WO | WO-2023217351 | A1 | * | 11/2023 | H04W 74/0833 |
| WO | WO-2024025572 | A1 | * | 2/2024 | H04J 14/0298 |
| WO | WO-2025029330 | A1 | * | 2/2025 | H04L 1/16 |

* cited by examiner

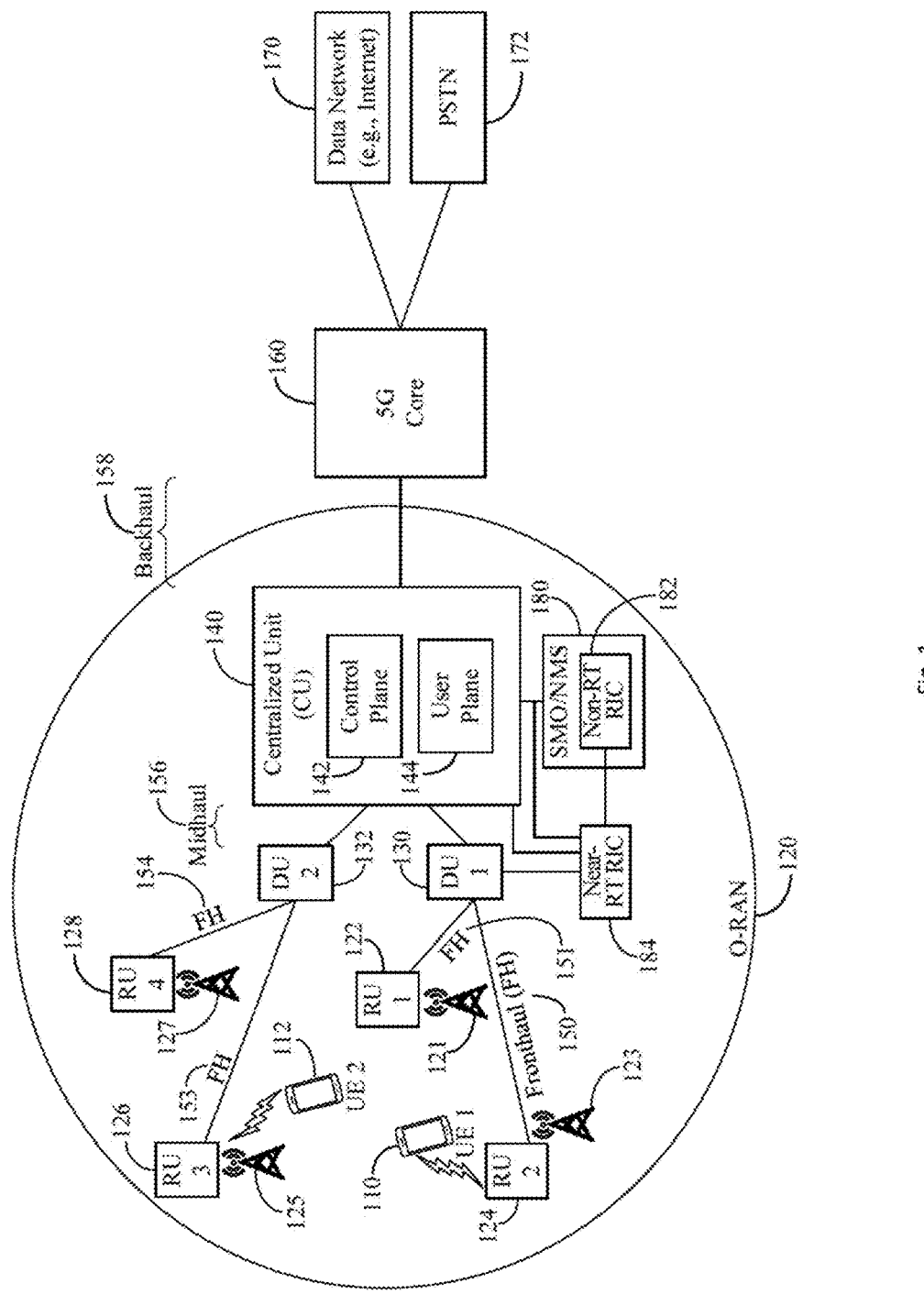
Fig. 1

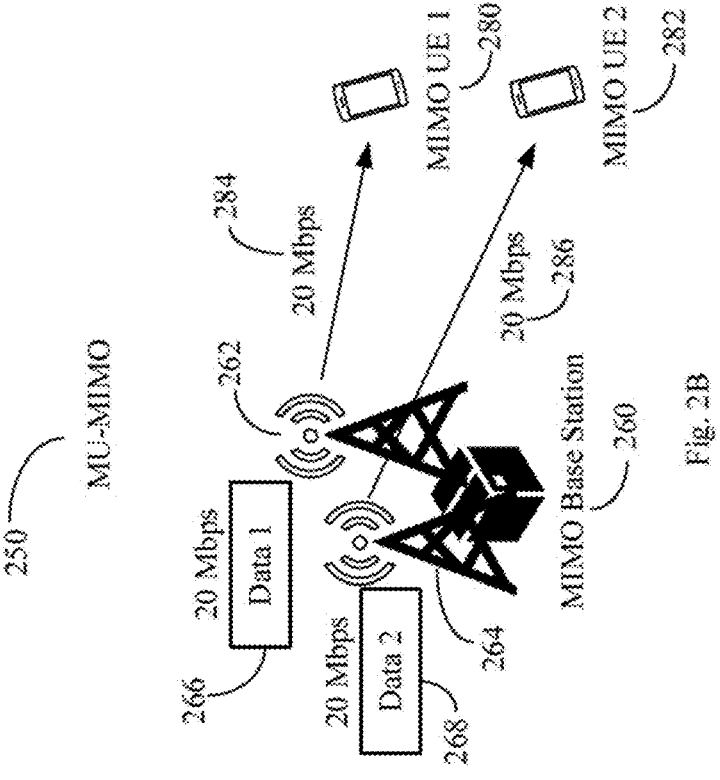
Fig. 2B
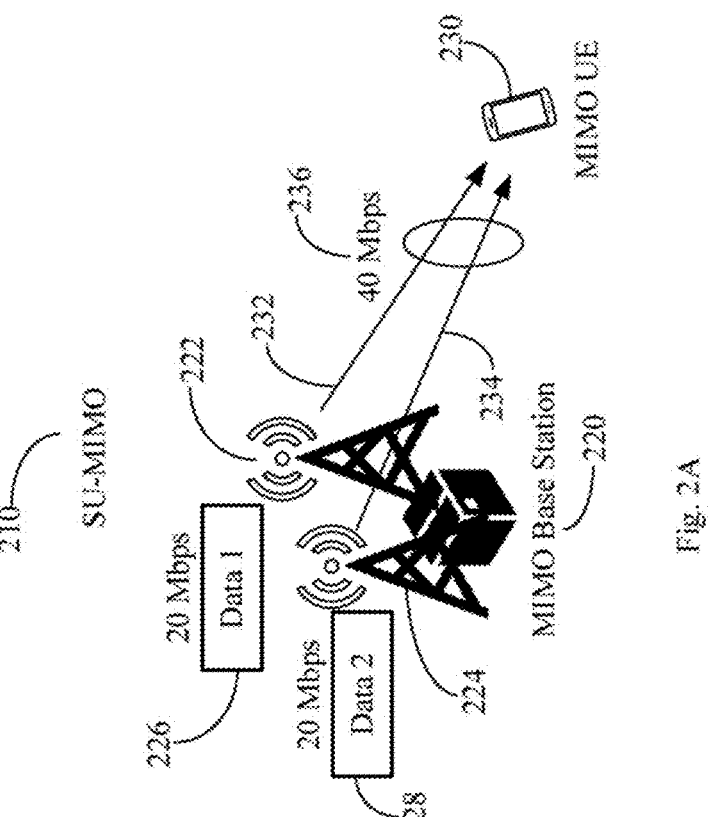
Fig. 2A

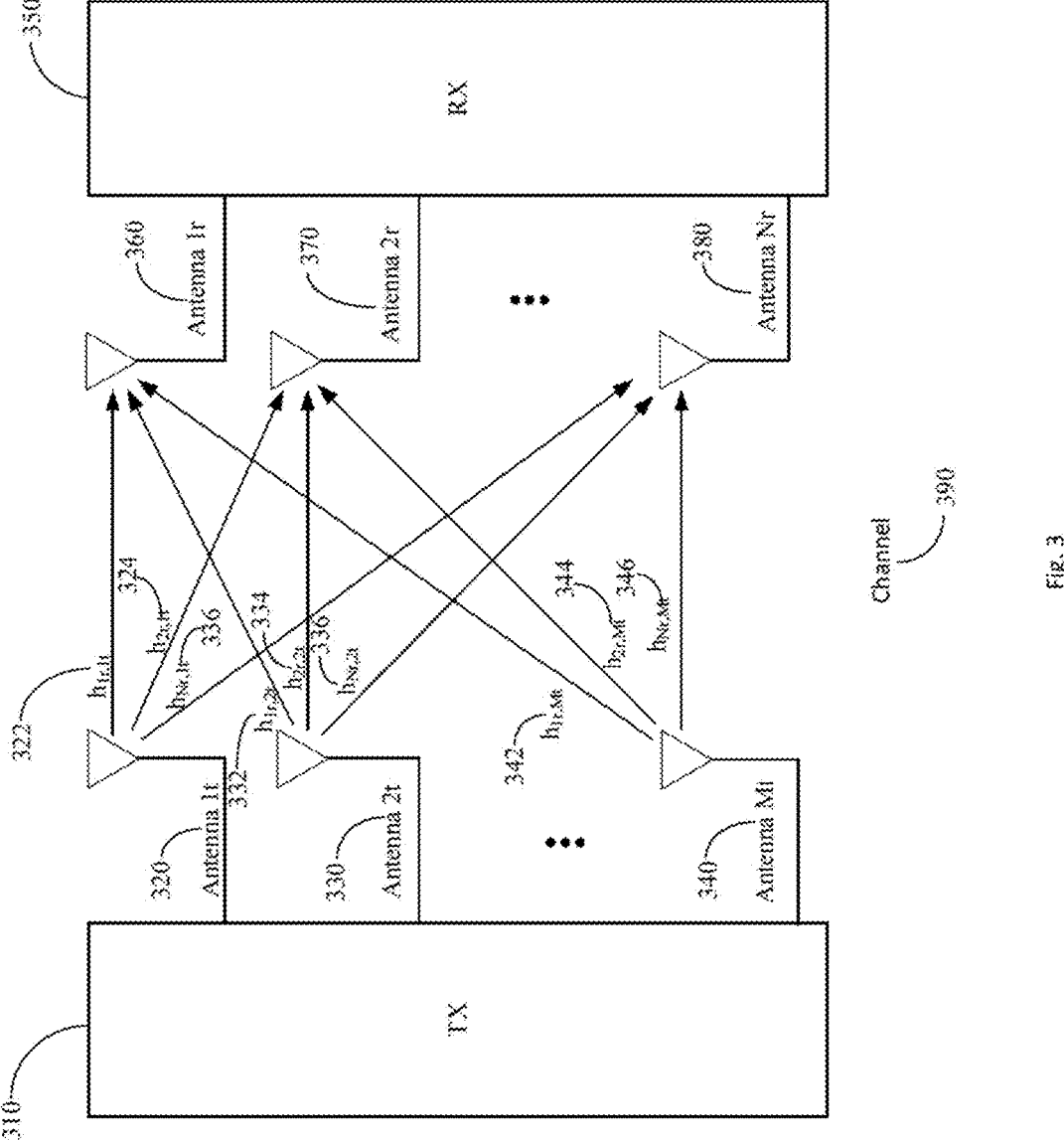
Fig. 3

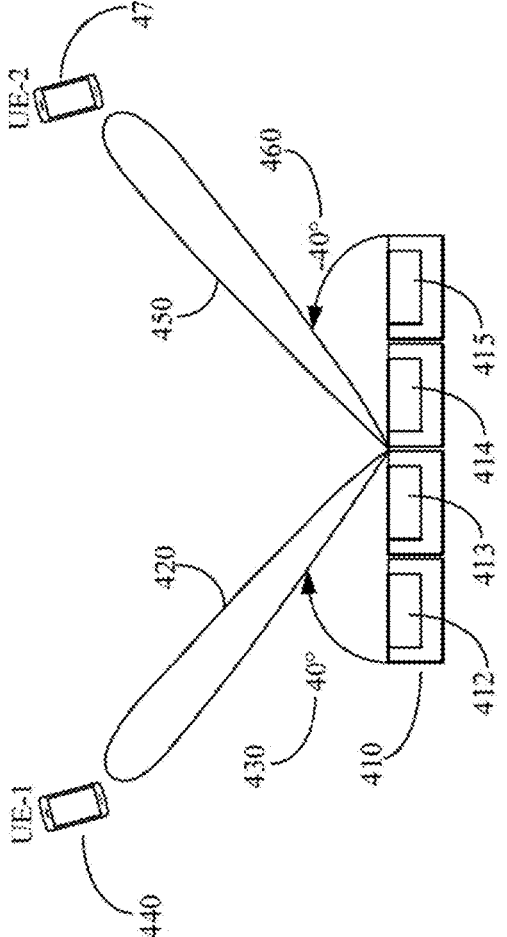
Fig. 4

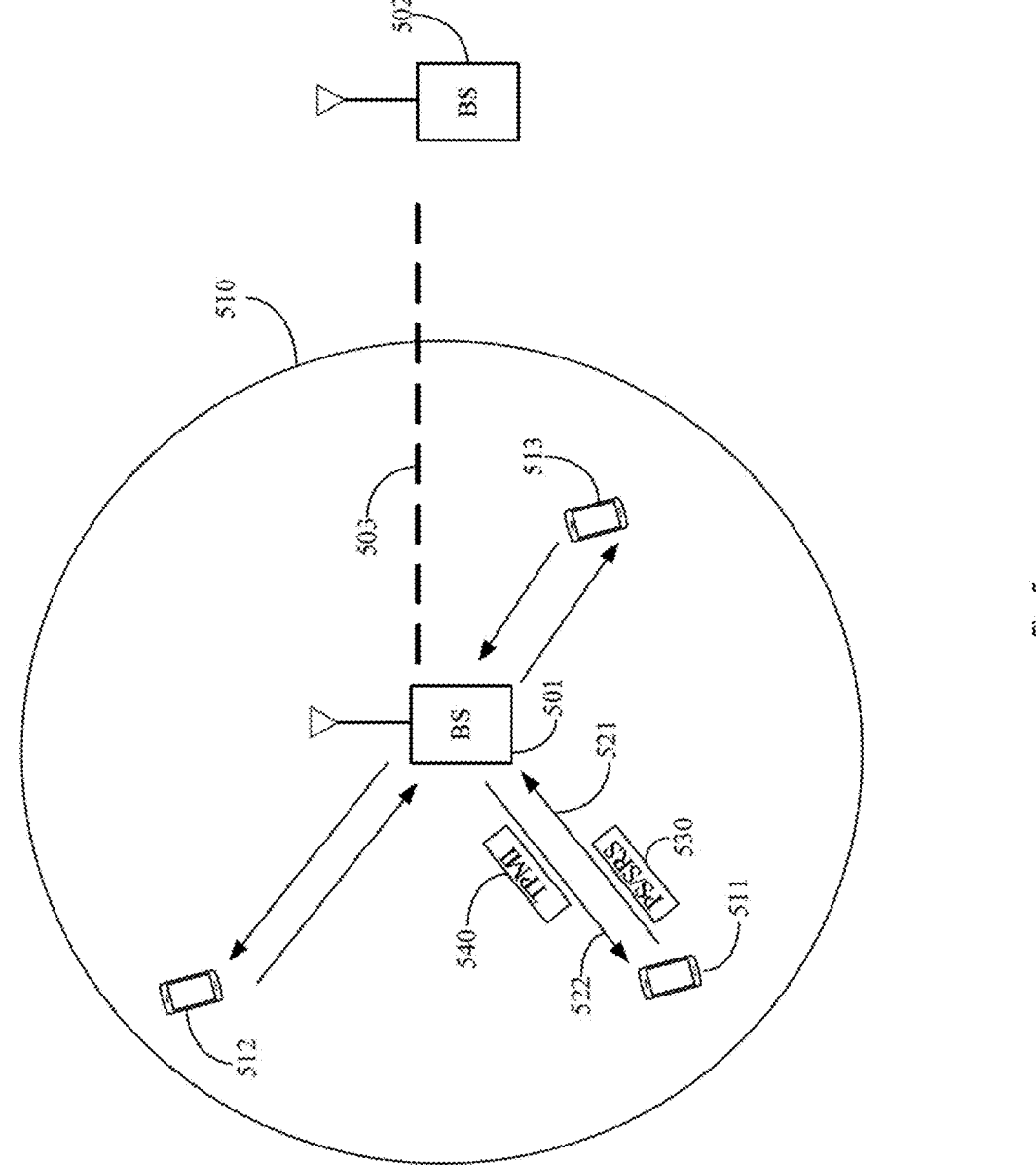
Fig. 5

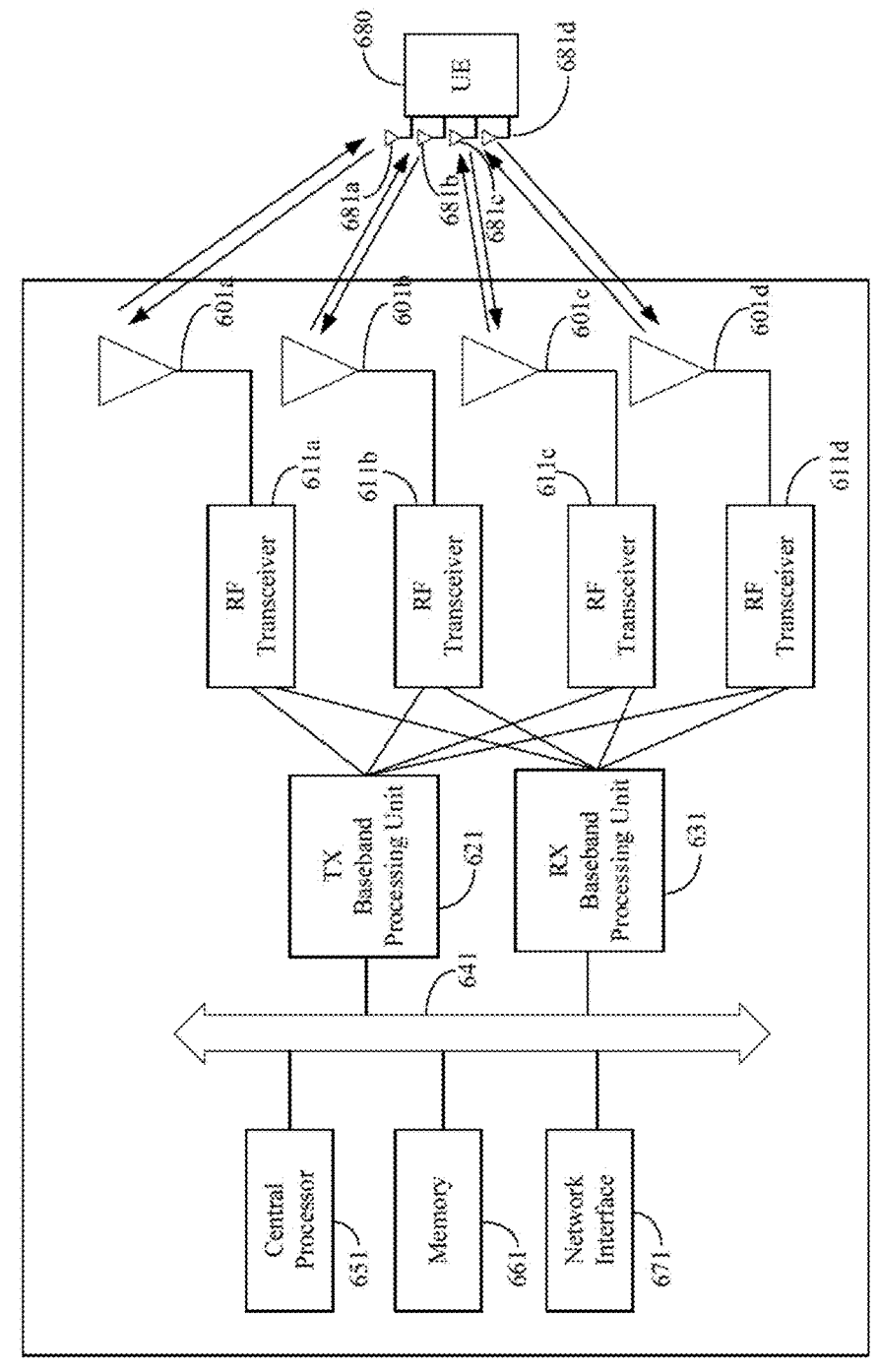
Fig. 6

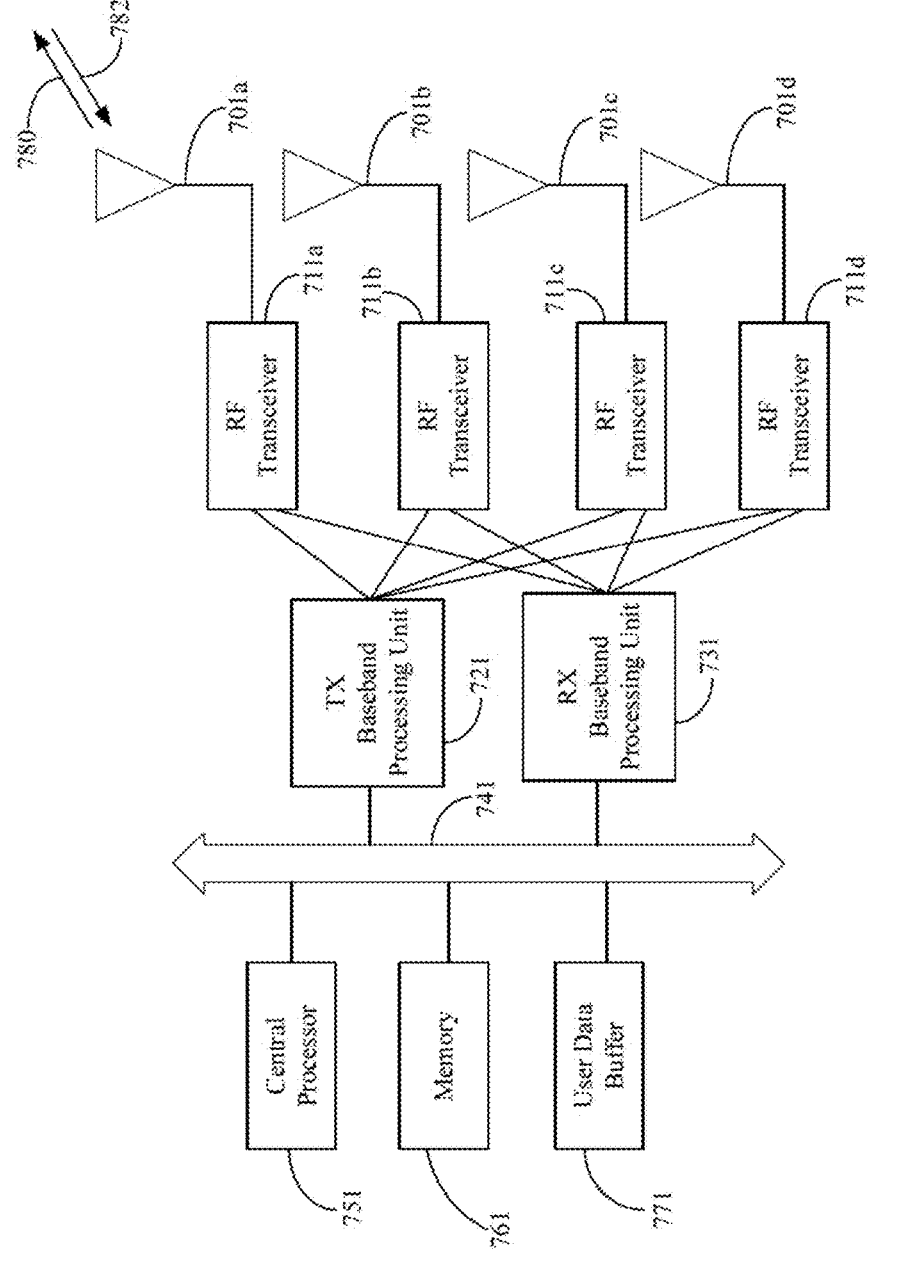
Fig. 7

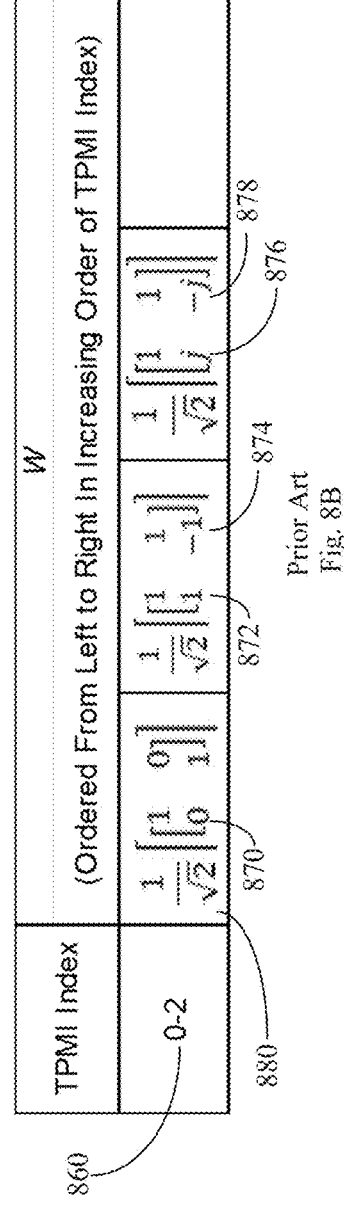

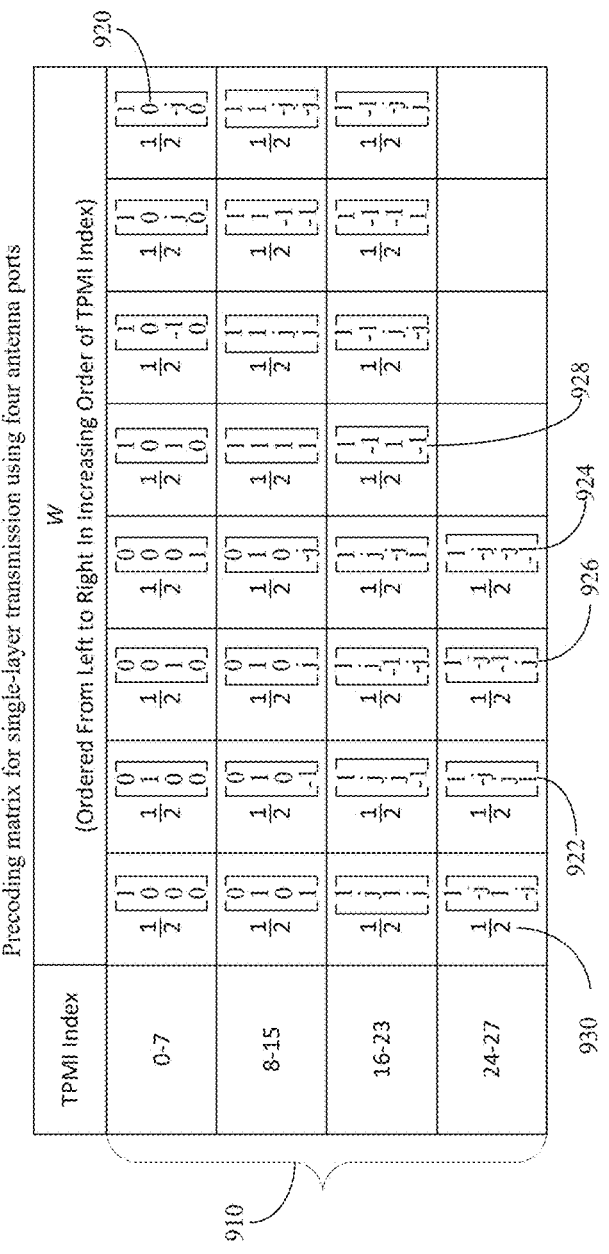
Prior Art
Fig. 9

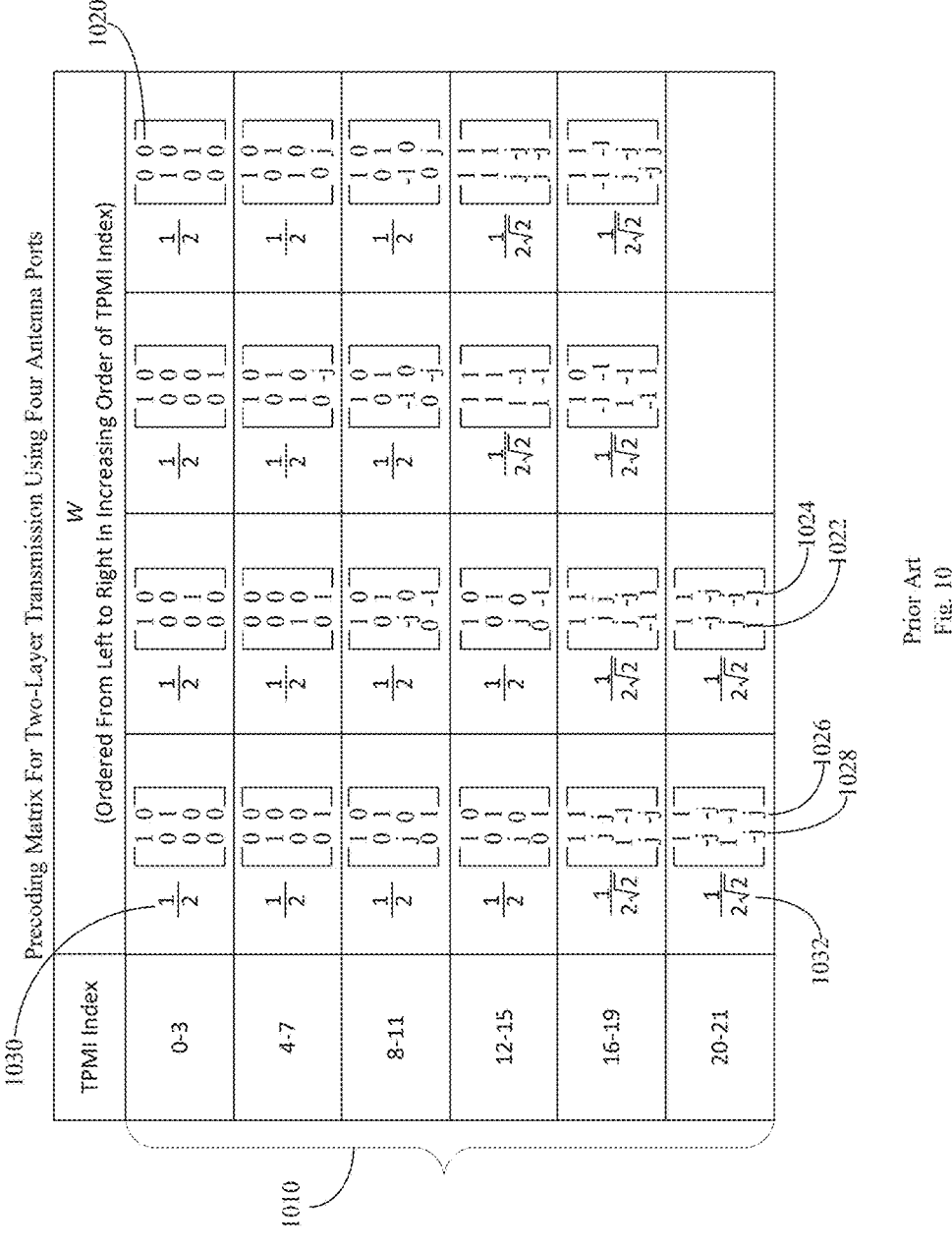
Prior Art
Fig. 10

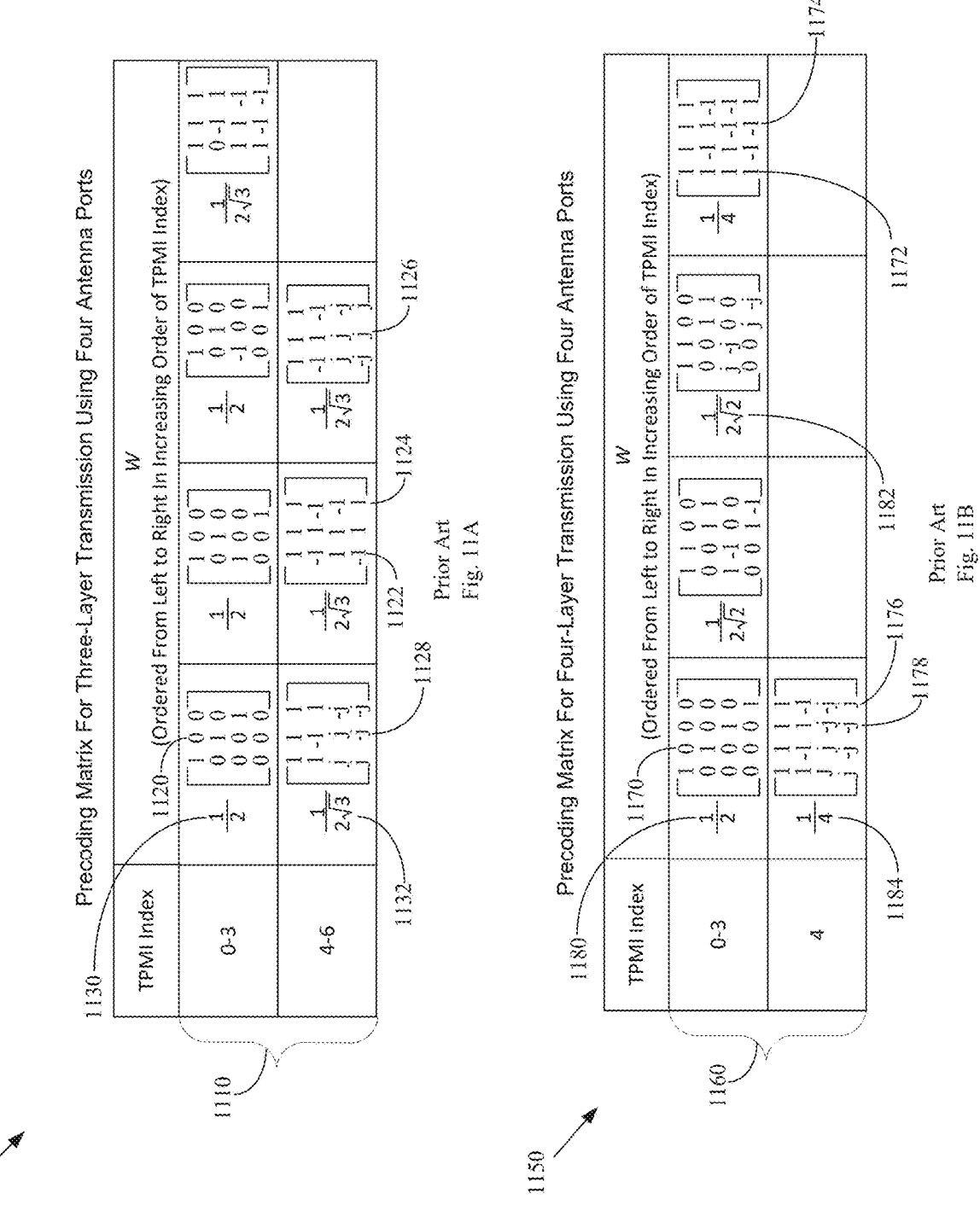
Prior Art
Fig. 11A
Prior Art
Fig. 11B

1200

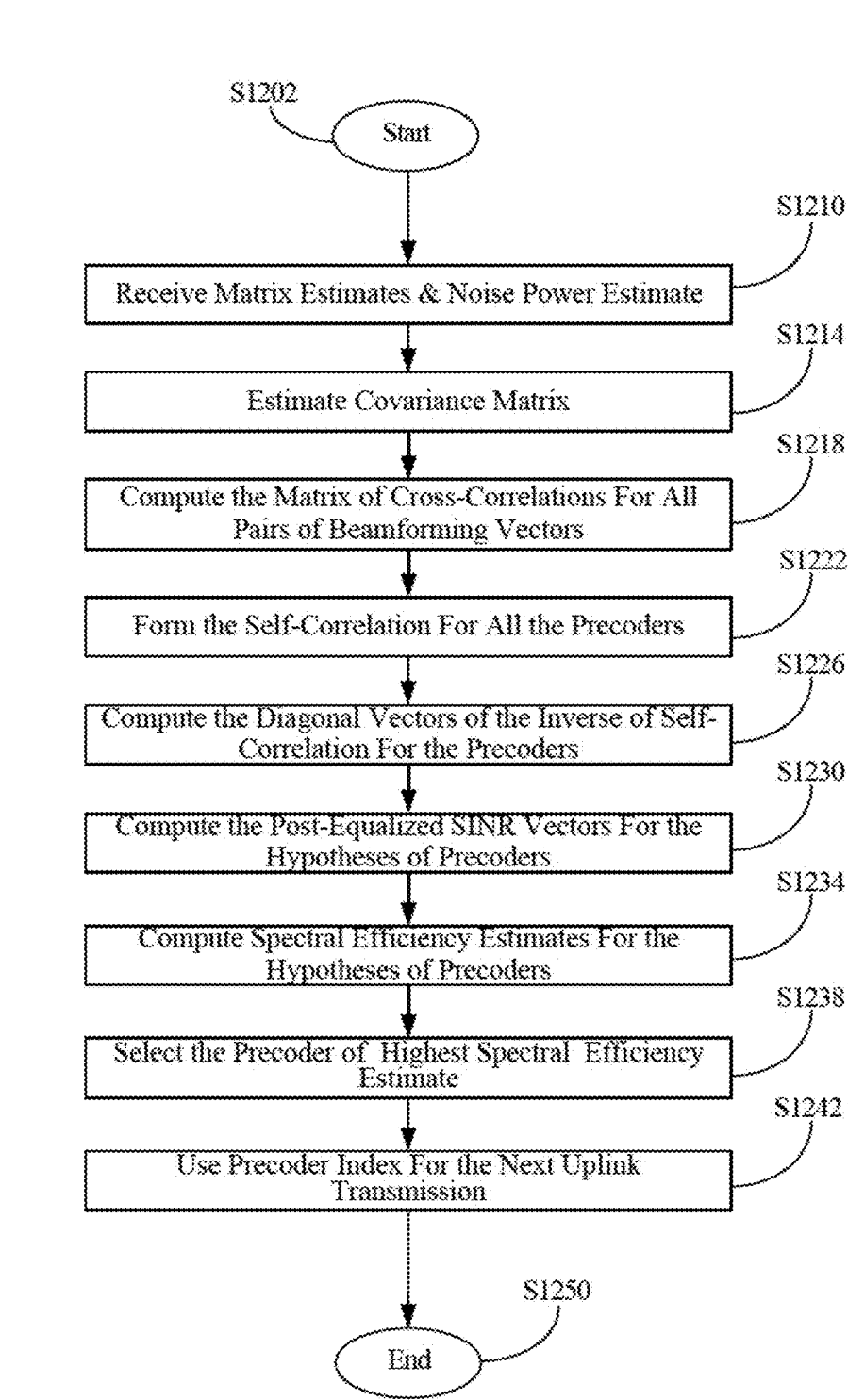

S1202

Start

S1210

Receive Matrix Estimates & Noise Power Estimate

S1214

Estimate Covariance Matrix

S1218

Compute the Matrix of Cross-Correlations For All Pairs of Beamforming Vectors

S1222

Form the Self-Correlation For All the Precoders

S1226

Compute the Diagonal Vectors of the Inverse of Self-Correlation For the Precoders

S1230

Compute the Post-Equalized SINR Vectors For the Hypotheses of Precoders

S1234

Compute Spectral Efficiency Estimates For the Hypotheses of Precoders

S1238

Select the Precoder of Highest Spectral Efficiency Estimate

S1242

Use Precoder Index For the Next Uplink Transmission

S1250

End

| TPMI Index | (Ordered From Left to Right in Increasing Z order of TPMI Index) | | |
|---|---|---|---|
| 0-2 | [0 1] | [2 3] | [4 5] |

| TPMI Index | (Ordered From Left to Right in Increasing Z order of TPMI Index) | | | |
|---|---|---|---|---|
| 0-3 | [0 1] | [0 2] | [0 3] | [1 2] |
| 4-7 | [1 3] | [2 3] | [4 11] | [4 10] |
| 8-11 | [7 8] | [7 9] | [5 11] | [5 10] |
| 12-15 | [6 8] | [6 9] | [12 14] | [13 15] |
| 16-19 | [16 18] | [17 19] | [20 22] | [21 23] |
| 20-21 | [24 26] | [25 27] | | |

| TPMI Index | (Ordered From Left to Right in Increasing Z order of TPMI Index) | | | |
|---|---|---|---|---|
| 0-3 | [0 1 2] | [4 1 3] | [5 1 3] | [12 20 14] |
| 4-6 | [13 21 15] | [20 12 22] | [21 13 24] | |

| TPMI Index | (Ordered From Left to Right in Increasing Z order of TPMI Index) | | | |
|---|---|---|---|---|
| 0-3 | [0 1 2 3] | [4 5 8 9] | [6 7 10 21] | [12 20 14 22] |
| 4 | [13 21 15 23] | | | |

Fig. 13D

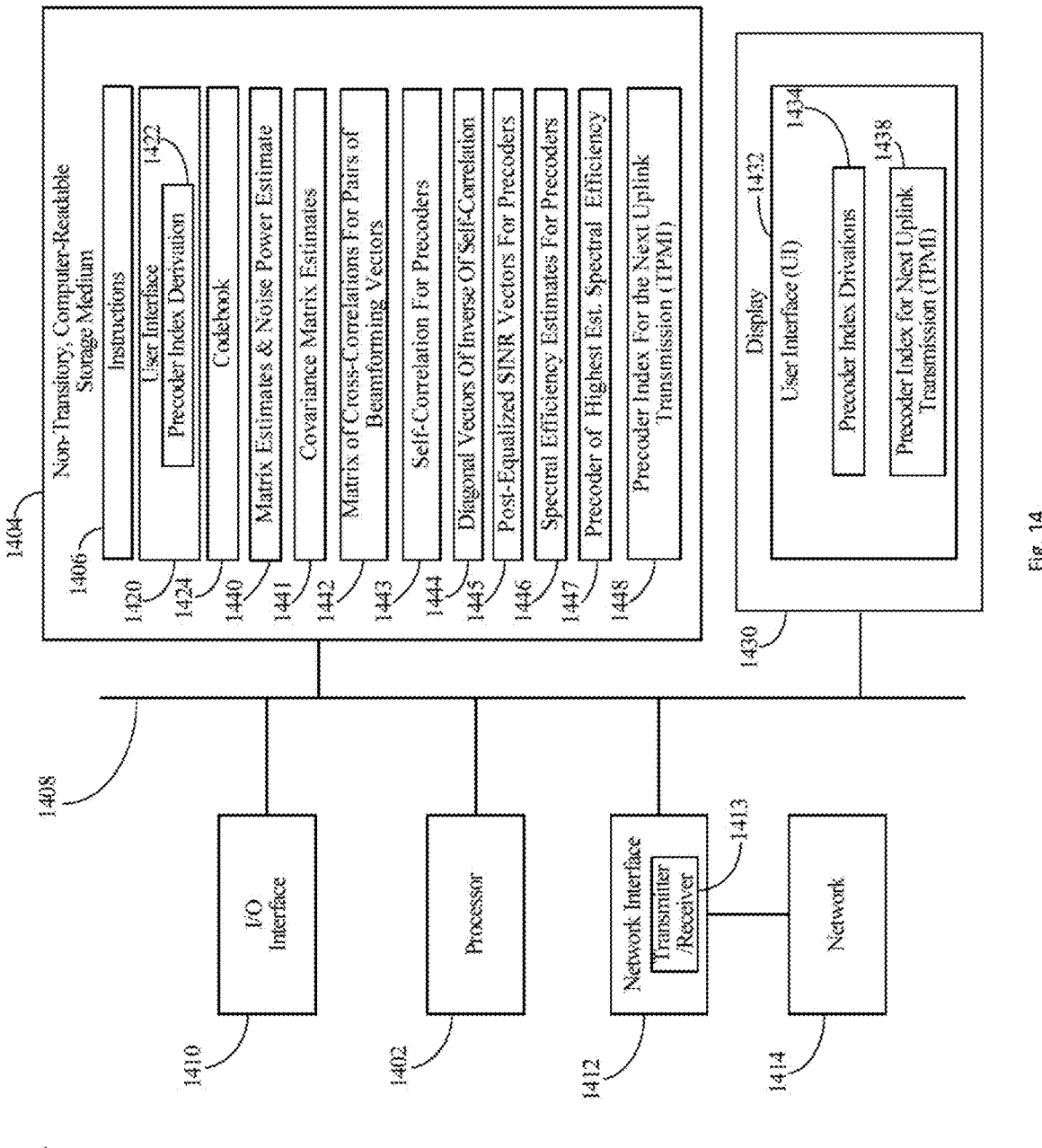
Fig. 14

TRANSMITTED PRECODING MATRIX INDICATOR (TPMI) DETERMINATION FOR NEW RADIO (NR) FREQUENCY RANGE 1 (FR1) SINGLE USER (SU) MULTIPLE INPUT MULTIPLE OUTPUT (MIMO) IN AN UPLINK

TECHNICAL FIELD

This description relates to Transmitted Precoding Matrix Indicator (TPMI) determination for New Radio (NR) Frequency Range 1 (FR1) Single User (SU) Multiple Input Multiple Output (MIMO) in an Uplink, and method of using the same.

BACKGROUND

Meeting the demands that are expected from wireless networks poses challenges for today's wireless system designers. The demand for higher data rate and better quality of service (QoS) in wireless communications continue to grow rapidly. Obtaining these requirements becomes challenging for wireless communication systems due to the problems of channel fading, higher power and bandwidth limitations. One of the most promising solutions to this problem is the Multiple Input Multiple Output (MIMO) system. Smart antenna arrays at both the transmitter and receiver enable spatial multiplexing and beamforming.

Linear precoding is a method to facilitate both the multiplexing gain and beamforming gain. A linear precoder is a matrix used to sum weighted data symbols in the data streams before mapping them to the transmit antennas. The number of columns of the matrix of precoder equals the number of layers and is referred to as the transmission rank of the precoder. A column vector of the precoder is a beamforming vector to beamform one of the data streams. There are various ways to form a precoder. However, a good precoder should adapt to the channel from the transmitter to the receiver. As such the derivation of precoder should be based on the knowledge of the channel.

In New Radio (NR), a radio access network (RAN) comprising a number of base stations (BSs) provides bidirectional wireless links to a large number of User Equipments (UEs). The link from a UE to a BS is called an uplink, while the link of the reverse direction is called a downlink. Both the BSs and UEs are equipped with multiple antennas to transmit and receiver signal over the radio media. NR supports both the codebook-based and non-codebook-based precoding schemes for uplink and the transmission rank is able to be four. The codebook based scheme is the feasible scheme for Frequency Division Duplexing (FDD) system of which the carrier frequency bands of uplink and downlink are different.

A pilot sent by a UE is called a Sounding Reference Signal (SRS) in NR. Multiple SRSs, possibly of multiple UEs, are able to be multiplexed in time, frequency, and cyclic-shift. The bandwidth of an SRS is configured by the network and signaled to the UE via a control channel. SRS bandwidth needs to be sufficiently large to capture sufficient information on the frequency selectivity of the wide bandwidth channel configured to the UE.

The information on the precoder used for an uplink data transmission grant is sent to a UE in a form of transmitted precoding matrix indicator (TPMI). In response to the UE being granted to transmit data signals with a large bandwidth, a single TPMI is provided by the network through Downlink Control Information (DCI) message serving to indicate the uplink grant. Different UEs at different locations are expected to be provided different TPMIs during around a burst of time. However, the computational complexity for TPMI derivation could be high.

SUMMARY

In at least embodiment, a method for deriving a precoder index from a precoder codebook includes receiving, at a Base Station (BS), a plurality of uplink channel matrix estimates from a User Equipment (UE), processing the plurality of uplink channel matrix estimates to determine spectral efficiency estimates corresponding to precoders in a codebook, and selecting, for a next transmission by the UE, an indicator of a precoder having a highest spectral efficiency estimate.

In at least one embodiment, a Base Station (BS) includes a memory storing computer-readable instructions, and a processor connected to the memory, wherein the processor is configured to execute the computer-readable instructions to perform operations to receive a plurality of uplink channel matrix estimates from a User Equipment (UE), process the plurality of uplink channel matrix estimates to determine spectral efficiency estimates corresponding to precoders in a codebook, and select, for a next transmission, an indicator of a precoder having a highest spectral efficiency estimate.

In at least one embodiment, a non-transitory computer-readable media having computer-readable instructions stored thereon, which when executed by a processor causes the processor to perform operations including receiving, at a Base Station (BS), a plurality of uplink channel matrix estimates from a User Equipment (UE), processing the plurality of uplink channel matrix estimates to determine spectral efficiency estimates corresponding to precoders in a codebook, and selecting, for a next transmission by the UE, an indicator of a precoder having a highest spectral efficiency estimate.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 1 illustrates a mobile network according to at least one embodiment.

FIGS. 2A-B show a comparison of Spatial Multiplexing (SM) Single User MIMO (SU-MIMO) to SM Multi-User MIMO (MU-MIMO) according to at least one embodiment.

FIG. 3 illustrates a Spatial Multiplexing (SM) Channel Matrix according to at least one embodiment.

FIG. 4 illustrates Beamforming according to at least one embodiment.

FIG. 5 illustrates an NR system.

FIG. 6 is a block diagram of a Base Station according to at least one embodiment.

FIG. 7 is a block diagram of a User Equipment according to at least one embodiment.

FIG. 8A presents precoding matrices for single-layer transmission using two antenna ports according to at least one embodiment.

FIG. 8B presents precoding matrices for two-layer transmission using two antenna ports according to at least one embodiment.

FIG. 9 presents precoding matrices for single-layer transmission using four antenna ports according to at least one embodiment.

FIG. 10 presents precoding matrices for two-layer transmission using four antenna ports according to at least one embodiment.

FIG. 11A presents precoding matrices for three-layer transmission using four antenna ports according to at least one embodiment.

FIG. 11B presents precoding matrices for four-layer transmission using four antenna ports according to at least one embodiment.

FIG. 12 is a flowchart of a method for deriving precoder index at a base station according to at least one embodiment.

FIG. 13A illustrates construction of two-layer precoders from a single-layer precoder for transmission using two antenna ports according to at least one embodiment.

FIG. 13B illustrates construction of two-layer precoders from a single-layer precoder for transmission using four antenna ports according to at least one embodiment.

FIG. 13C illustrates construction of three-layer precoders from a single-layer precoder for transmission using four antenna ports according to at least one embodiment.

FIG. 13D illustrates construction of four-layer precoders from single-layer precoder for transmission using four antenna ports according to at least one embodiment.

FIG. 14 is a high-level functional block diagram of a processor-based system according to at least one embodiment.

DETAILED DESCRIPTION

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streaming or signaling-streaming from UE.

In at least embodiment, a method for deriving a precoder index from a precoder codebook includes receiving, at a Base Station (BS), a plurality of uplink channel matrix estimates from a User Equipment (UE), processing the plurality of uplink channel matrix estimates to determine spectral efficiency estimates corresponding to precoders in a codebook, and selecting, for a next transmission by the UE, an indicator of a precoder having a highest spectral efficiency estimate.

Embodiments described herein provide method that provides one or more advantages. For example, according to at least one embodiment, a low computationally complex method is provided for deriving Transmitted Precoding Matrix Indicator (TPMI) for identifying a precoder to apply for the next uplink transmission. Redundant arithmetic operations are removed by exploiting 3GPP NR codebook structure. Uplink capacity is increased through application of a precoder identified by the TPMI for transmission between a BS and a UE. The method according to at least one embodiment provides a rigorous solution for deriving TPMI by following clear steps of predictable computation resource consumption. According to at least one embodiment, the matrix of cross-correlations of beamforming vectors is computed and the entities in the matrix of cross-correlations of beamforming vectors are mapped to the self-correlation matrices for the hypothesis of the precoders in a codebook. The elements in the main diagonal of the inverse of a self-correlation matrix is used to produce estimates of post-equalized Signal to Interference & Noise Ratios (SINRs), which are then converted to spectral efficiency evaluation metrics. Although the are several other approaches to estimate the spectral efficiency from an effective channel matrix, the method described in embodiments described herein has lower complexity due to the fact that the main diagonal elements in inverse matrices are used, while other off-diagonal elements are not used. This leads to a saving of computational operations and instructions.

According to at least one embodiment, a BS processes the plurality of Uplink Channel Matrix Estimates to determine an Estimate Of A Covariance Matrix for the transmission channel using the plurality of Uplink Channel Matrix Estimates. The BS determines the Estimates Of The Covariance Matrix by averaging the self-multiplications of the Uplink Channel Matrix Estimates. The BS is able to remove redundant arithmetic operations for determining the Self-correlation Matrices Of The Effective Channels For Precoders by implementing two Steps: determines a Matrix of Cross-Correlations for component beamforming vectors of the single layer precoders, wherein multi-layer precoders of layer greater than one are formed by tiling component beamforming vectors of the single layer precoders, and determines the Self-correlation Matrices for all the precoders by picking appropriate elements in the Matrix of Cross-Correlation formed in the previous step. The BS determines Main Diagonal Vectors Of An Inverse Of The Self-correlation Matrix of the effective channel of the multi-layer precoders. The BS determines the Estimates Of Post-Equalized SINR Vectors of the multi-layer precoders based on the main diagonal vectors and noise power estimates under the zero-forcing receiver assumption. The BS determines the Spectral efficiency estimates corresponding to all the precoders by mapping the Estimates Of Post-Equalized SINR Vector for each hypothesized precoder to a Spectral efficiency estimate. The map from SINR Values to Spectral efficiency estimate Values depending on a quality of Receiver. The Base Station updates the map from controlled measurements. The BS determines the TPMI by selecting, for the next transmission by the UE, the indicator of the precoder having the Highest Spectral efficiency estimate.

FIG. 1 illustrates a mobile network 100 according to at least one embodiment.

In FIG. 1. UE 1 (User Equipment 1) 110 and UE 2 112 access Mobile Network 100 via a Radio Access Network 120.

Radio Access Network 120 includes Radio Towers 121, 123, 125, and 127. Radio Towers 121, 123, 125, 127 are associated with RU (Radio Unit) 1 122, RU 2 124, RU 3 126, and RU 4 128, respectively.

RU 1 122, RU 2 124, RU 3 126, RU 4 128 handle the Digital Front End (DFE) and the parts of the PHY layer, as well as the digital beamforming functionality. RU 1 122 and RU 2 124 are associated with Distributed Unit (DU) 1 130, and RU 3 126 and RU 4 128 are associated with DU 2 132. DU 1 130 and DU 2 132 are responsible for real time Layer-1 and Layer-2 scheduling functions. For example, in 5G, Layer-1 is the Physical Layer, Layer-2 includes the Media Access Control (MAC), Radio link control (RLC), and Packet Data Convergence Protocol (PDCP) layers, and Layer-3 (Network Layer) is the Radio Resource Control (RRC) layer. Layer-2 is the data link or protocol layer that defines how data packets are encoded and decoded, and how data is to be transferred between adjacent network nodes. Layer-3 is the network routing layer and defines how data is moves across the physical network.

DU 1 130 is coupled to the RU 1 122 and RU 2 124, and DU 2 132 is coupled to RU 3 126 and RU 4 128. DU 1 130 and DU 2 132 run the RLC, MAC, and parts of the PHY layer. DU 1 130 and DU 2 132 include a subset of the eNB/gNB functions, depending on the functional split option, and operation of DU 1 130 and DU 2 132 are controlled by Centralized Unit (CU) 140. CU 140 is responsible for non-real time, higher L2 and L3. Server and relevant software for CU 140 is able to be hosted at a site or is able to be hosted in an edge cloud (datacenter or central office) depending on transport availability and the interface for the Fronthaul connections 150, 151, 153, 154. The server and relevant software of CU 140 is also able to be co-located at DU 1 130 or DU 132, or is able to be hosted in a regional cloud data center.

CU 140 handles the RRC and PDCP layers. The gNB includes CU 140 and one or more DUs, e.g., DU 1 130, connected to CU 140 via Fs-C and Fs-U interfaces for a Control Plane (CP) 142 and User Plane (UP) 144, respectively. CU 140 is able to be connected to multiple DUs, e.g., DU 1 130, and DU 2 132, to support multiple gNBs. The split architecture enables a 5G network to utilize different distribution of protocol stacks between CU 140, and DU 1 130 and DU 2 132, depending on network design and availability of the Midhaul 156. While two connections are shown between CU 140 and DU 1 130 and DU 2 132, CU 140 is able to implement additional connections to other DUs. CU 140, in 5G, is able to implement, for example, 256 endpoints or DUs. CU 140 supports the gNB functions such as transfer of user data, mobility control, RAN sharing (Multi-Operator RAN-MORAN), positioning, session management etc. However, one or more functions are able to be allocated to the DU. CU 140 controls the operation of DU 130 and DU 132 over the Midhaul interface 156.

Backhaul 158 connects the 4G/5G Core 160 to the CU 140. Core 160 is able to be 200 km away from the CU 140. Core 160 provides access to voice and data networks, such as Internet 170 and Public Switched Telephone Network (PSTN) 172.

RAN 120 is able to implement multi-antenna gain techniques, such as spatial multiplexing and beamforming. Spatial multiplexing is used to increase channel capacity by sending the data payload in separate streams through spatially separated antennas. Multiple subchannels are created for transmission of multiple data streams by applying a set of precoding and combining weights derived from the channel matrix. 5G beamforming uses multiple antennas to control the direction of a wavefront by appropriately weighting the magnitude and phase of individual antenna signals in an array of multiple antennas. The same signal is sent from multiple antennas that have sufficient space between them, e.g., ½ wavelength. In any given location, a receiver receives multiple copies of the same signal, and depending on the location of the receiver, the signals are able to be in opposite phases, destructively averaging each other out, or constructively sum up in response to the different copies being in the same phase, or anything in between.

RAN 120 is also able to MIMO (Multiple Input Multiple Output), including mMIMO (massive MIMO), to provide an increases in throughput and signal to noise ratio. MIMO antennas operate by breaking high data rate signals into multiple lower data rate signals in Tx mode that are recombined at the receiver. Massive MIMO, which is an extension of MIMO, expands beyond the legacy systems by adding a much higher number of antennas on a Base Station.

According to at least one embodiment, a northbound platform for the network, such as a Service Management and Orchestration (SMO)/Network Management System (NMS) 180, oversees the orchestration aspects, management and automation of RAN elements. SMO 180 supports O1, A1 and O2 interfaces. Non-RT RIC (non-Real-Time RAN Intelligent Controller) 182 enables non-real-time control and optimization of RAN elements and resources, Artificial Intelligence/Machine Learning (AI/ML) workflow including model training and updates, and policy-based guidance of applications/features in Near-RT RIC 184. Near-RT RIC 184 enables near-real-time control and optimization of O-RAN elements and resources via fine-grained data collection and actions over the E2 interface. Near-RT RIC 184 includes interpretation and enforcement of policies from Non-RT RIC 182, and supports enrichment information to optimize control function.

Near-RT RIC 184 obtains information associated with the beams that is passed to Non-RT RIC 182 and processed, for example, by RAN Intelligent Controller Applications (rApps) at the Non-RT RIC 184, to implement the above-described multi-antenna gain techniques, such as generating an interference matrix, implementing spatial multitasking, and implementing beamforming. extended Applications (xApps) are hosted on the Near-RT RIC 184 and optimize radio spectrum efficiency. rApps are specialized microservices operating on the Non-RT RIC 182. xApps and rApps provide essential control and management features and functionality. One or more signals is sent to one or more elements in the O-RAN, e.g., RUs 122, 124, 126, 128, DUs 130, 132, CU 140, etc. to implement one or more multi-antenna gain techniques.

FIGS. 2A-B show a comparison of Spatial Multiplexing (SM) Single User MIMO (SU-MIMO) to SM Multi-User MIMO (MU-MIMO) according to at least one embodiment.

In FIG. 2A, SM SU-MIMO 210 is used to implement a multi-transmitter and receiver technique that lets a wireless access point, e.g., MIMO Base Station 220, sends multiple, simultaneous data streams to one compatible MIMO UE 230 at a time. Available bandwidth is divided into multiple spatial streams 232, 234 to act as a stream 236 with increased bandwidth to improve the efficiency and reliability of transmissions.

SM SU-MIMO 210 uses a MIMO Base Station 220 with 2 antennas 222, 224. MIMO Base Station 220 transmits a signal from antennas 222, 224 to a MIMO User Equipment (UE) 230. Thus, Data 1 226 is transmitted to MIMO UE 230 by a first antenna 222 at 20 Mbps and Data 2 228 is transmitted to MIMO UE 230 by a second antenna 224 at 20 Mbps. An overall transmission rate of 40 Mbps 236 is able to be provided to MIMO UE 230.

In FIG. 2B, a SM Multi-User MIMO (MU-MIMO) 250 uses a MIMO Base Station 260 with 2 antennas 262, 264. MIMO Base Station 260 transmits a signal from antennas 262, 264 to 2 separate MIMO UEs 280, 282. Thus, Data 1 266 is transmitted to MIMO UE 1 280 by a first antenna 262 at 20 Mbps and Data 2 268 is transmitted to MIMO UE 2 282 by a second antenna 264 at 20 Mbps. The overall system is able to achieve a transmission rate of 40 Mbps, but the transmission rate to MIMO UE 1 280 and the transmission rate to MIMO UE 2 282 are 20 Mbps.

SU-MIMO 210 shown in FIG. 2A increases the throughput of one user, while MU-MIMO 250 shown in FIG. 2B allows increasing the overall system capacity as opposed to increasing the data transfer rate of one user. SM employs the use of multiple antennas at both transmitting and the receiving ends. The MIMO Base Stations 220, 260 are able to switch between SU-MIMO and MU-MIMO based on channel conditions and the ability of MIMO UE 230, or MIMO UE 1 280 and MIMO UE 2 282 to update the system on real time conditions, which is able to be achieved by taking advantage of the spatial dimension of the MIMO channel. However, the spatial dimension is such that transmitting antennas 222, 224, or transmitting antennas 262, 264 of MIMO Base Station 220 or MIMO Base Station 260, respectively, transmit different data streams while receiving antenna at MIMO UE 230, or MIMO UE 1 280 and MIMO UE 2 282, respectively, receive the transmitted data streams. MIMO Base Station 260 creates spatially distinct separate channels between antennas 262, 264 and MIMO UE 1 280 and MIMO UE 2 282, respectively, so that MIMO UE 1 280 and MIMO UE 2 282 process the information intended to be provided to MIMO UE 1 280 and MIMO UE 2 282. However, those skilled in the art understand that FIG. 2A and FIG. 2B are simplified illustrations and that the number of antenna are able to be increase. For example, MU-MIMO 250 is able to have 2 antenna to transmit to MIMO UE 1 and 2 antenna to transmit to MIMO UE 2. Thus, a matrix of channels is able to be implemented for a MIMO UE.

MIMO systems are interoperable with most of the modern wireless standards available, this includes the IEEE 802.11n, LTE, NR, and WiMAX. The continuous increase in demand for high throughputs is one of major problems which led to the development of the MIMO transmission technique because it yields high data rates even in sever conditions of interference, multipath and signal fading.

FIG. 3 illustrates a Spatial Multiplexing (SM) Channel Matrix 300 according to at least one embodiment.

In FIG. 3, a Transmitter (TX) 310 is shown having M Transmitting Antennas 320, 330, 340. A Receiver is shown having N Receiving Antennas 360, 370, 380. As shown in FIG. 3, SM allows the M Transmitting Antennas 320, 330, 340 to send a stream of data to the N Receiving Antennas 360, 370, 380 at the same time and via the same frequency within the same sector. The User Equipment (UE) in turn decodes a stream of data and reconstructs the data into its original sequence.

Spatial multiplexing is a technique that uses multiple transmit antennas to transmit independent data streams using the same time and frequency resources of a transmit channel. In response to being combined with the OFDM transmission scheme, cells are multiplied and mapped orthogonally between one another thereby eliminating the occurrence of interference in a cell. In SM, each independent channel is called a layer or a stream. The number of layers or streams or a spatial multiplexing rate is called a rank. For example, Antenna It 320, is referred to as a '"Layer". SM results in a linear increase of throughput with the number of layers, thus, massively increasing data speed and capacity.

A channel matrix of Channel 390 is used to determine a specific transmission. In FIG. 3, the M Transmitting Antennas 320, 330, 340 and the N receiving antennas 360, 370, 380 create a N×M matrix for the reference point of any MIMO transmission scenario. The channel coefficients between a transmitter (x) and a receiver (y) are written as (Hx,y), which is used to calculate the propagation path between the transmitter and the receiver. The rank of the matrix $\{Mt, Nr\}$ specifies the least number of data streams that are to be transmitted and received over a MIMO channel. Signals form Antenna 320 have channel coefficients $h_{1r,1t}$ 322, $h_{2r,1t}$ 324, $h_{Nr,1t}$ 326. Signals form Antenna 330 have channel coefficients $h_{1r,2t}$ 332, $h_{2r,2t}$ 334, $h_{Nr,2t}$ 336. Antenna 340 have channel coefficients $h_{1r,Mt}$ 342, $h_{2r,Mt}$ 344, $h_{Nr,Mt}$ 346.

FIG. 4 illustrates Beamforming 400 according to at least one embodiment.

In FIG. 4, Beamforming 400 is implemented using a 4-element Panel Antenna System 410 wherein the first Beam 420 radiates a signal towards the angle of 40° by controlling Phase Shift 430. Beam 420 is able to be steered to track User Equipment-1 (UE-1) 440 as UE-1 440 moves, for example, from left to right. Beam 450 is to provide a Phase Shift 460 towards the angle of −40° that is focused on UE-2 470.

Beamforming 400 focuses the wireless signal in a desired direction, normally towards a specific receiving device, e.g., UE-1 440 or UE-2 470. This results in an improvement of received signal strength at UE-1 440 or UE-2 470, and also less interference between the signals of individual UE-1 440 and UE-2 470.

Antenna System 410 is a phased antenna array that is designed so that the radiation patterns from individual elements are combined constructively with those from neighboring elements to form an effective radiation pattern for the main lobe of Beam 420 or Beam 450, which transmits energy in the desired direction. At the same time, Antenna System 410 is also designed to form nulls towards the undesired directions so that signals sent in undesired directions are combined destructively.

Antenna System 410 is designed to maximize the energy radiated in the Beam 420 or Beam 450, while limiting the energy in the side lobes to an acceptable level. The direction of the Beam 420 or Beam 450 is controlled by manipulating the radio signals applied to the individual Antenna Elements 412, 413, 414, 415 in Antenna System 410. Antenna Elements 412, 413, 414, 415 in Antenna System 410 are fed with the same transmitted signal, but the phases and amplitudes are adjusted to steer Beam 420 or Beam 450 in the desired direction. FIG. 5 illustrates an NR System 500.

In FIG. 5, NR System 500 provides services for a RAN that includes a number of Base Stations (BSs) including BSs 501 and 502. BS 501 provides coverage in Cell 510. Both BSs 501, 502 connect to the Internet via a core network, as shown in FIG. 1. BSs 501, 502 are able to have Connection 503 between each other. BS 501 provides wireless connections to a number of UEs including UEs 511, 512, 513. The wireless connection from UE 511 to BS 501 is bidirectional. The link of the direction from UE 511 to BS 501 is the Uplink 521; the link of the direction from BS 501 to UE 511 is Downlink 522. UE 511 sends SRS 530 to BS 501. BS 501 analyzes SRS 530 to obtains knowledge about the channel.

BS 501 scans through the precoders in a codebook by obtaining channel matrix estimates, determining an estimate of a covariance matrix, determining a cross-correlation matrix of component beamformers, forming self-correlation matrices of effective channels for the precoders, determining a set of diagonal elements of the inverse of the self-correlation matrices of the effective channels for the precoders, determining post-equalized Signal to Interference & Noise Ratio (SINR) vectors for the precoders, determining spectral efficiency estimates for the precoders, and selecting the best precoder index for the next uplink transmission.

BS 501 obtains the channel matrix estimates by measuring the SRS 530. BS 501 determines the estimate of the covariance matrix by averaging the self-multiplications of the available channel matrix estimates for different subcarriers across a bandwidth of SRS 530 received from UE 511. By calculating a covariance matrix, BS 501 captures the interesting channel characteristics of the radio channels between UE 511 and the BS 501. The BS 501 computes the self-correlations of effective channels for the precoders by using a matrix storing one-time computed cross-correlations of component beamforming vectors. The component beamforming vectors are rank-1 precoders in the codebook. The use of the matrix storing the cross-correlations of component beamforming vectors is to remove redundant arithmetic operations as the column vectors of the precoders with ranks higher than 1 are all identified as rank-1 precoders.

BS 501 selects the best precoder index from a codebook based on the knowledge about the channel derived from SRS 530. BS 501 determines the TPMI 540 corresponding to the precoder associated with the highest spectral efficiency estimate by scanning through the precoders in the codebook to compute spectral efficiency estimates including computing, for a hypothesized precoder of rank r, a vector of r estimates of post-equalized signal-to-interference-plus-noise-ratio (SINR) under the assumption of zero-forcing equalization at the BS, and mapping the estimate of post-equalized SINR vector for a hypothesized precoder to a metric of spectral efficiency. The map from SINR values to spectral efficiency values depends on a receiver quality of the BS, wherein the map is updated from controlled measurements. BS 501 determines TPMI 540 having a best match to the uplink channel matrix estimates. The BS 501 signals TPMI 540 to UE 511 in a downlink control information (DCI) message through Downlink 522. The UE receives TPMI 540 that identifies the selected precoder index. UE 511 uses the selected precoder index for the next uplink transmission.

FIG. 6 is a block diagram of Base Station (BS) 600 according to at least one embodiment.

In FIG. 6, BS 600 includes a plurality of antennas, e.g., Antennas 601a-601d, a plurality of RF transceivers, e.g., RF Transceivers 611a-611d, TX Baseband Processing Unit 621, RX Baseband Processing Unit 631, Bus 641, Central Processer 651, Memory 661, and Network Interface 671. Antennas 601a-601d are used for transmitting and receiving signals, but transmission and reception are not operated at the same time. Antennas 601a-601d transmit and then receive in sequence. UE 680 also includes a plurality of antennas, e.g., Antennas 681a-681d. While the BS in the illustration has four antennas, BS 600 is able to have a larger number of antennas than that of UE 680.

FIG. 7 is a block diagram of User Equipment (UE) 700 according to at least one embodiment.

In FIG. 7, UE 700 includes a plurality of antennas, e.g., Antennas 701a-701d, a plurality of RF transceivers, e.g., RF Transceivers 711a-711d, TX Baseband Processing Unit 721, RX Baseband Processing Unit 731, Central Processer 741, Bus 751, Memory 761, and a Transmitted User Data Buffer 771.

A BS sends SRS configuration to UE 700 through higher-layer signaling over Downlink Channel 780. UE 700 transmits SRS accordingly over Uplink Channel 782. For clarity, one uplink channel, Uplink Channel 780, and one downlink channel, Downlink Channel 782, are illustrated. However, those skilled in the art recognize that more downlink channels and uplink channels are able to be provided for Antennas 701a-d.

The BS measures SRS to estimate Uplink Channel 780. Whenever User Data Buffer 771 has data, UE 700 sends a Scheduling Request (SR) to the BS over Uplink Channel 780. After receiving the SR, the BS specifies a suitable transmission parameter set including TPMI for the next uplink transmission by UE 700. Then, the BS sends an uplink grant comprising the specified transmission parameters to UE 700 through a DCI message over Downlink Channel 782. After receiving the uplink grant, UE 700 converts the data in User Data Buffer 771 and an additional Cyclic Redundancy Check (CRC) to Physical layer User Shared CHannel (PUSCH) signals, which are configured according to the transmission parameters provided in the uplink grant, and transmits the PUSCH signals over Uplink Channel 780. The BS attempts to decode the PUSCH signals and declare the success of transmission in response to success of CRC.

As described separately above, multiplexing gain and beamforming gain provide benefits without any additional costs, such as increases in transmission power or an increase in communication bandwidth. The multiplexing gain is represented by the number of concurrent data streams, which is also known as the number of transmission layers. The beamforming gain is represented by the increase of received signal strengths at the receive antennas.

Linear precoding is used to facilitate both the multiplexing gain and beamforming gain. A linear precoder is a matrix used to weight and sum the data symbols in the data streams before mapping them to the transmit antennas. The number of columns of the matrix of precoder equals the number of layers and is referred to as the transmission rank of the precoder. A column vector of the precoder is a beamforming vector to beamform one of the data streams. There are various ways to form a precoder. However, a good precoder adapts to the channel from the transmitter to the receiver. As such the derivation of a precoder is to be based on the knowledge of the channel.

There are two precoding schemes that are classified based on where the derivation of the precoder takes place: codebook-based and non-codebook-based precoding schemes. In response to the transmitter being unable to derive the precoder by itself due to the lack of channel knowledge, the receiver takes the role of deriving the precoder. The transmitter and receiver agree on a common finite set of possible precoders, known as a codebook, and the receiver instructs the transmitter which precoder, which is derived by the receiver, to be used by the transmitter for precoding in the next transmission by referring to an index in the codebook via a feedback link. To select a suitable element in the codebook for precoding, the receiver performs channel estimation by looking at the pilot signals directly transmitted by the transmitter. The scheme described above is referred to as codebook-based precoding, while the counterpart scheme without the need of a common agreed codebook is called non-codebook-based precoding.

NR supports both the codebook-based and non-codebook-based precoding schemes for uplink and the transmission rank is able to be up to four. However, the codebook based scheme is the scheme used for frequency division duplexing (FDD) system of which the carrier frequency bands of uplink and downlink are different.

Referring again to FIG. 5, both BS 501 and UE 511 use multiple antennas to facilitate MIMO technologies. However, the number of antennas at BS 501 are able to be much larger than the number of antennas at UE 511. BS 501 determines the uplink precoder for UE 511 by measuring SRS. For NR, the codebook-based precoding mechanism for uplink transmission includes the signaling of uplink precoding information via downlink control signaling. UE 511 first transmits a non-precoded SRS on its transmit antennas. The SRS travels through Uplink Channel 521 to BS 501. BS 501 estimates Uplink Channel 521 by measuring the SRS 530. Multiple SRSs, possibly of multiple UEs, are able to be multiplexed in time, frequency, and cyclic-shift. The bandwidth of an SRS is specified by BS 501 and signaled to the UE 511 for SRS configuration via a control channel. SRS bandwidth is to be sufficiently large to capture sufficient information on the frequency selectivity of the wide bandwidth of the uplink channel.

BS 501 is able to measure the uplink channel using the SRSs and determine the appropriate antenna port for PUSCH, selects the appropriate rank and precoding weights. BS 501 provides feedback to UE 511 in terms of SRS resource indicator (SRI) and Transmit Precoding Matrix Indicator (TPMI) 540. The information on the precoder used for an uplink data transmission grant is sent to UE 511 in a form of TPMI 540. A single TPMI, i.e., TPMI 540, is provided to UE 511 as a part of an uplink grant embedded in a DCI message.

TPMI 540 is the precoding matrix index for the UE 511 to use for the next uplink transmission. After receiving the TPMI 540, the UE 511 applies the precoding on the data signal and sends the precoded signal in Uplink Channel 521. In granting permission to UE 511 for transmitting the data signal in a wide bandwidth, only a single TPMI 540 is provided. Different UEs at different locations, e.g., UE 511, UED 512, UE 513, are expected to be provided different TPMIs during a predetermined amount of time.

Upon receiving a signal from UE 511, BS 501 attempts to decode the signal. BS 501 checks the cyclic-redundancy information to verify the integrity of data sent by UE 511.

The BS 501 extracts the possible precoders used by UE 511 from the codebooks specified in the 3GPP Specifications. The precoders are arranged in codebooks according to the number of layers and the number of antennas. However, prior methods for deriving the best precoder index based on the estimate of the uplink channel from a UE are too complex. At least one embodiment described herein provides a method having lower complexity for deriving the best precoder index. The advantage of the method according to at least one embodiment is that determining TPMI 540 is computationally less complex. The lower complexity is obtained by eliminating many redundant arithmetic operations and exploiting the codebook structure specified by 3GPP for NR. Given the computational capability of the BS 501 is limited, the solution increases uplink capacity as the BS 501 is more capable to provide TPMI 540 for a larger number of active UEs, such as UE 511, UE 512, UE 513.

The codebooks used for the codebook-based precoding scheme for the uplink are provided in FIG. 8A, FIG. 8B, FIG. 9, FIG. 10, FIG. 11A, and FIG. 11B according to 3GPP Specifications for NR. In particular, for the transmissions using two antennas, FIG. 8A and FIG. 8B provide the precoders for single-layer transmission and two-layer transmission, respectively. For the transmissions using four antennas, FIG. 9, FIG. 10, FIG. 11A, and FIG. 11B provide the precoders for single-layer transmission, two-layer transmission, three-layer transmission and four-layer transmission, respectively. While embodiments using two antenna and four antenna are described herein, those skilled in the art recognize that the embodiments described herein are not meant to be limited to two or four antenna.

FIG. 8A presents precoding matrices for single-layer transmission using two antenna ports 800 according to at least one embodiment.

In FIG. 8A, the TPMI index set is "0-5" 810. A single layer data stream gets transmitted by two antennas. The precoders are 2×1 matrixes. The set of precoding matrices 800 is constructed from the modulation alphabet of 0 820, +1 822, −1 824, +j 826, −j 828 with a scaling factor of $$\frac{1}{\sqrt{2}} 830.$$

FIG. 8B presents precoding matrices for two-layer transmission using two antenna ports 850 according to at least one embodiment.

In FIG. 8B, the TPMI index set is "0-2" 860. The precoders are 2×2 matrixes. Again, the set of precoding matrices 850 is constructed from the modulation alphabet of 0 870, +1 872, −1 874, +j 876, −j 878 with a scaling factor of $$\frac{1}{\sqrt{2}} 880.$$

FIG. 9 presents precoding matrices for single-layer transmission using four antenna ports 900 according to at least one embodiment.

In FIG. 9, the TPMI index set is "0-27" 910. The precoders are 4×1 matrices. The set of precoding matrices 900 is constructed from the modulation alphabet of 0 920, +1 922, −1 924, +j 926, −j 928 with a scaling factor of $$\frac{1}{2} 930.$$

FIG. 10 presents precoding matrices for two-layer transmission using four antenna ports 1000 according to at least one embodiment.

In FIG. 10, the TPMI index set is "0-21" 1010. The precoders are 4×2 matrices. The precoding matrix set 1000 is constructed from the modulation alphabet of 0 1020, +1 1022, −1 1024. +j 1026, −j 1028 with scaling factors of $$\frac{1}{2}\,1030 \text{ and } \frac{1}{2\sqrt{2}}\,1032.$$

FIG. 11A presents precoding matrices for three-layer transmission using four antenna ports 1100 according to at least one embodiment.

In FIG. 11A, the TPMI index is "0-6" 1110. The precoders are 4×4 matrices. The precoding matrix set 1100 is constructed from the modulation alphabet of 0 1120, +1 1122, −1 1124. +j 1126, −j 1128 with scaling factors of $$\frac{1}{2}\,1130 \text{ and } \frac{1}{2\sqrt{3}}\,1132.$$

FIG. 11B presents precoding matrices for four-layer transmission using four antenna ports 1150 according to at least one embodiment.

In FIG. 11B, the TPMI index is "0-4" 1160. The precoders are 4×4 matrices. The precoding matrix set 1150 is constructed from the modulation alphabet of 0 1170, +1 1172, −1 1174, +j 1176, −j 1178 with scaling factors of $$\frac{1}{2}\,1180, \ \frac{1}{2\sqrt{2}}\,1182, \text{ and } \frac{1}{4}\,1184.$$

FIG. 12 is a flowchart 1200 of a method for deriving precoder index at a base station according to at least one embodiment.

In FIG. 12, prior to deriving the best TPMI, multiple uplink channel matrix estimates and a noise power estimates are required. The multiple uplink channel matrix estimates and noise power estimates are obtained from measurement of SRS measurement. The uplink channel matrix estimation and noise power estimation are performed in S1210. The estimates of uplink channel matrix are denoted by H(0), H(1), . . . , H(K−1) and the estimate of noise power is denoted by $\sigma^2$. Referring to FIG. 5, BS 501 determines the uplink precoder for UE 511 by measuring SRS. For NR, the codebook-based precoding mechanism for uplink transmission includes the signaling of uplink precoding information via downlink control signaling. UE 511 first transmits a non-precoded SRS on its transmit antennas. The SRS travels through Uplink Channel 521 to BS 501. BS 501 estimates Uplink Channel 521 by measuring the SRS 530. Multiple SRSs, possibly of multiple UEs, are able to be multiplexed in time, frequency, and cyclic-shift. The bandwidth of an SRS is specified by BS 501 and signaled to the UE 511 for SRS configuration via a control channel. SRS bandwidth is to be sufficiently large to capture sufficient information on the frequency selectivity of the wide bandwidth of the uplink channel. BS 501 is able to measure the uplink channel using the SRSs. BS 501 obtains the channel matrix estimates by measuring the SRS 530.

The estimate of a covariance matrix is computed using the plurality of uplink channel matrix estimates H(k) S1214. Referring to FIG. 5, BS 501 determines the estimate of the covariance matrix by averaging the self-multiplications of the available channel matrix estimates for different subcarriers across a bandwidth of SRS 530 received from UE 511. By calculating a covariance matrix. BS 501 captures the interesting channel characteristics of the radio channels between UE 511 and the BS 501.

In S1214, the channel covariance matrix estimate is computed according to:

$$D = \frac{1}{K}\sum\nolimits_{k=0}^{K-1}(H(k))^H H(k).$$

The number of rank-1 precoder in the codebook is denoted by V. For the transmissions using two antenna ports, V=6, as for "0-5" 810, as shown in FIG. 8A. For the transmissions using four antenna ports, V=28, as for "0-27" 910, as show in FIG. 9. The possible single-layer precoders are denoted as $u_0, u_1, \ldots, u_{V-1}$, which are listed entities in FIG. 8A and FIG. 9 for the transmissions using two and four antenna ports, respectively. These single-layer precoders are considered as component beamforming vectors.

In S1218, Cross-Correlation Matrix A of size V×V are computed. The entity (i,j)th, $0 \le i$, $j \le V-1$, is computed only for component beamforming vectors of the single layer precoders.

Cross-Correlation Matrix A is computed according to:

$$[A]_{i,j} = u_i^H D u_j.$$

As shown in FIG. 8B, FIG. 10, FIG. 11A, and FIG. 11B, the precoders for the transmissions with number of layers rather than one constructed by tiling several component beamforming vectors together in rows.

FIG. 13A illustrates construction of two-layer precoders from a single-layer precoder for transmission using two antenna ports 1300 according to at least one embodiment.

FIG. 13B illustrates construction of two-layer precoders from single-layer precoder for transmission using four antenna ports 1330 according to at least one embodiment.

FIG. 13C illustrates construction of three-layer precoders from a single-layer precoder for transmission using four antenna ports 1360 according to at least one embodiment.

FIG. 13D illustrates construction of four-layer precoders from a single-layer precoder for transmission using four antenna ports 1390 according to at least one embodiment.

The self-correlation matrix of an effective channel is formed using the single-layer precoders, wherein the hypothesis of using precoder $W_p$ of r layers, is constructed from r single-layer precoders of indices $[p_0, p_1, \ldots p_{r-1}]$ in S1222. Referring to FIG. 5, the BS 501 computes the self-correlations of effective channels for the precoders by using a matrix storing one-time computed cross-correlations of component beamforming vectors.

The self-correlation for the precoders is formed according to:

$$T_p^{(r)} = \begin{bmatrix} t_{p,0,0} & \cdots & t_{p,0,r-1} \\ \vdots & \ddots & \vdots \\ t_{p,r-1,0} & \cdots & t_{p,r-1,r-1} \end{bmatrix},$$

with $t_{p,i,j} = [A]_{p_i,p_j}$ for $0 \le i \le j \le r-1$, and $$t_{p,i,j} = t_{p,i,j}^* \text{ for } 0 < j < i < r - 1.$$

For example, for a transmission using two antenna ports, from FIG. 13A, the precoder of index 1 for two layers is constructed from the set of indices $[p_0, p_1] = [2,3]$. In this case, the self-correlation matrix of effective channel is:

$$T_1^{(2)} = \begin{bmatrix} [A]_{2,2} & [A]_{2,3} \\ [A]_{2,2}^* & [A]_{3,3} \end{bmatrix}.$$

The main diagonal vectors of an inverse of the self-correlation matrix of the effective channels of the r-layer precoders are computed in S1226. The elements in the main diagonal of the inverse of the self-correlation of effective channel form the vector:

$$\begin{bmatrix} [Z_p^{(r)}]_{0,0} \\ \vdots \\ [Z_p^{(r)}]_{r-1,r-1} \end{bmatrix},$$

where:

$$Z_p^{(r)} = (T_p^{(r)})^{-1}.$$

The post-equalized SINR vectors of the r-layer precoders based on the main diagonal vectors and the noise power estimates are computed in S1230. The r-length post-equalized SINR vector for the hypothesis of using precoder $W_p$ of r layers is computed to obtain:

$$SINR_p^{(r)} = \begin{bmatrix} SINR_{p,0}^{(r)} \\ \vdots \\ SINR_{p,r-1}^{(r)} \end{bmatrix},$$

$$\text{with } SINR_{p,i}^{(r)} = \frac{1}{r} \times \frac{1}{[Z_p^{(r)}]_{i,i} \times \sigma^2} \, 0 \le i \le r - 1.$$

A function mapping from SINR value x to spectral efficiency is denoted as $\eta(x)$ and it is able to be vendor implementation specific.

The spectral efficiency estimates of the r-layer precoders based on the post-equalized SINR vectors of the r-layer precoders are computed in S1234. The spectral efficiency for the hypothesis of r-layer precoder $W_p$ is computed as:

$$\gamma_p^{(r)} = r \times \min_{0 \le i \le r-1} \{\eta(SINR_{p,i}^{(r)})\}.$$

A rank and precoder index of a precoder having a highest spectral efficiency estimate from spectral efficiency estimates of all the precoders in the codebook is selected for transmission in S1238.

The most suitable transmission rank and precoder index are selected as $$(\hat{r}, \hat{p}) = \operatorname*{argmax}_{r,p} \{\gamma_p^{(r)}\}.$$

Referring to FIG. 5, BS 501 determines the TPMI 540 corresponding to the precoder associated with the highest spectral efficiency estimate by scanning through the precoders in the codebook to compute spectral efficiency estimates including computing, for a hypothesized precoder of rank r, a vector of r estimates of post-equalized signal-to-interference-plus-noise-ratio (SINR) under the assumption of zero-forcing equalization at the BS, and mapping the estimate of post-equalized SINR vector for a hypothesized precoder to a metric of spectral efficiency. The map from SINR values to spectral efficiency values depends on a receiver quality of the BS, wherein the map is updated from controlled measurements. BS 501 determines TPMI 540 having a best match to the uplink channel matrix estimates.

The determined TPMI 540 is used by UE for the next uplink transmission in S1242. Referring to FIG. 5. The BS 501 signals TPMI 540 to UE 511 in a downlink control information (DCI) message through Downlink 522. The UE receives TPMI 540 that identifies the selected precoder index. UE 511 uses the selected precoder index for the next uplink transmission.

At least one embodiment, a method for deriving a precoder index from a precoder codebook includes receiving, at a Base Station (BS), a plurality of uplink channel matrix estimates from a User Equipment (UE), processing the plurality of uplink channel matrix estimates to determine spectral efficiency estimates corresponding to precoders in a codebook, and selecting, for a next transmission by the UE, an indicator of a precoder having a highest spectral efficiency estimate.

FIG. 14 is a high-level functional block diagram of a processor-based system 1400 according to at least one embodiment.

In FIG. 14, at least one embodiment provides processing circuitry 1400 provides a low computational complexity method for deriving Transmitted Precoding Matrix Indicator (TPMI) for identifying a precoder to apply for uplink transmission. Processing circuitry 1400 implements a low computational complexity method for deriving TPMI for identifying a precoding matrix to apply for uplink transmission using Processor 1402. Processing circuitry 1400 also includes a Non-Transitory, Computer-Readable Storage Medium 1404 that is used to implement a low computational complex method for deriving TPMI for identifying a precoding matrix to apply for uplink transmission.

Non-Transitory, Computer-Readable Storage Medium 1404, amongst other things, is encoded with, i.e., stores, Instructions 1406, i.e., computer program code, that are executed by Processor 1402 to cause Processor 1402 to perform operations for deriving TPMI for identifying a precoder to apply for uplink transmission. Execution of Instructions 1406 by Processor 1402 represents (at least in part) an application which implements at least a portion of the methods described herein in accordance with one or more embodiments (hereinafter, the noted processes and/or methods).

Processor 1402 is electrically coupled to Non-Transitory, Computer-Readable Storage Medium 1404 via a Bus 1408. Processor 1402 is electrically coupled to an Input/Output (I/O) Interface 1410 by Bus 1408. A Network Interface 1412 is also electrically connected to Processor 1402 via Bus 1408. Network Interface 1412 is connected to a Network 1414, so that Processor 1402 and Non-Transitory, Computer-Readable Storage Medium 1404 connect to external elements via Network 1414. Processor 1402 is configured to execute Instructions 1406 encoded in Non-Transitory, Computer-Readable Storage Medium 1404 to cause processing circuitry 1400 to be usable for performing at least a portion of the processes and/or methods. In one or more embodiments, Processor 1402 is a Central Processing Unit (CPU), a multi-processor, a distributed processing system, an Application Specific Integrated Circuit (ASIC), and/or a suitable processing unit.

Processing circuitry 1400 includes I/O Interface 1410. I/O interface 1410 is coupled to external circuitry. In one or more embodiments, I/O Interface 1410 includes a keyboard, keypad, mouse, trackball, trackpad, touchscreen, and/or cursor direction keys for communicating information and commands to Processor 1402.

Processing circuitry 1400 also includes Network Interface 1412 coupled to Processor 1402. Network Interface 1412 allows processing circuitry 1400 to communicate with Network 1414, to which one or more other computer systems are connected. Network Interface 1412 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 1400 is configured to receive information through I/O Interface 1410. The information received through I/O Interface 1410 includes one or more of instructions, data, design rules, libraries of cells, and/or other parameters for processing by Processor 1402. The information is transferred to Processor 1402 via Bus 1408. Processing circuitry 1400 is configured to receive information related to a User Interface (UI) through I/O Interface 1410. The information is stored in Non-Transitory, Computer-Readable Storage Medium 1404 as User Interface (UI) 1420. Precoder Index Derivations 1422 are calculated and associated with UI 1422.

In one or more embodiments, one or more Non-Transitory, Computer-Readable Storage Medium 1404 having stored thereon Instructions 1406 (in compressed or uncompressed form) that is able to be used to program a computer, processor, or other electronic device to perform processes or methods described herein. The one or more Non-Transitory, Computer-Readable Storage Medium 1404 include one or more of an electronic storage medium, a magnetic storage medium, an optical storage medium, a quantum storage medium, or the like.

For example, the Non-Transitory, Computer-Readable Storage Medium 1404 is able to include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 1404 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 1404 stores Instructions 1406 configured to cause Processor 1402 to perform at least a portion of the processes and/or methods for deriving TPMI for identifying a precoder to apply for uplink transmission. In one or more embodiments, Non-Transitory, Computer-Readable Storage Medium 1404 also stores information, such as algorithm which facilitates performing at least a portion of the processes and/or methods for deriving TPMI for identifying a precoder to apply for uplink transmission. Accordingly, in at least one embodiment, Processor 1402 executes Instructions 1406 stored on the one or more Non-Transitory, Computer-Readable Storage Medium 1404 to implement a low computational complexity method for deriving TPMI for identifying a precoding matrix to apply for uplink transmission. In at least one embodiment, Processor 1402 executes Instructions 1406 stored on the one or more Non-Transitory, Computer-Readable Storage Medium 1404 to receive Uplink Channel Matrix Estimates 1440 based on Sounding Reference Signals (SRS) And Noise Power Estimates. Processor 1402 executes Instructions 1406 to process a plurality of Uplink Channel Matrix Estimates 1440 to determine an Indicator 1448 in Codebook 1424 of the precoder having the highest spectral efficiency estimate by determining an Estimate Of A Covariance Matrix 1441 for an UpLink (UL) transmission channel using the plurality of Uplink Channel Matrix Estimates 1440, determining a Cross-Correlation Matrix 1442 based on component beamforming vectors of the single layer precoders, wherein multi-layer precoders of layer greater than one are formed by tiling component beamforming vectors of the single layer precoders, forming Self-Correlation Matrices 1443 of effective channels for the multi-layer precoders, determining Main Diagonal Vectors Of The Inverses Of The Self-Correlation Matrices 1444 of the effective channels for the multi-layer precoders, determining Post-Equalized Signal to Interference & Noise Ratio (SINR) Vectors 1445 of the multi-layer precoders based on the main diagonal vectors and noise power estimates 1440, and determining Spectral Efficiency Estimates 1446 for the multi-layer precoders based on the Post-Equalized SINR Vectors 1445 of the multi-layer precoders. Covariance Matrix Estimate 1441 is determined by Processor 1402 using the plurality of Uplink Channel Matrix Estimates 1440 (H(k)). By calculating a covariance matrix, Processor 1402 captures the interesting channel characteristics of the radio channel with a UE. The channel characteristics are obtained by calculating the Covariance Matrix Estimate 1441 using Channel Matrix Estimates and Noise Power Estimate 1440. Processor 1402 determines the Estimate Of The Covariance Matrix 1441 by estimating a single channel covariance matrix from multiple available Channel Matrix Estimates 1440. The multiple available Channel Matrix Estimates 1440 being determined for different subcarriers across a bandwidth of Sounding Reference Signals (SRS) signals 1440 received from the UE. Processor 1402 computes the Covariance Matrix Estimate 1441 by averaging the self-multiplication of the UL Channel Matrix Estimates 1440. Processor 1402 computes the Matrix Of Cross-Correlations For Pairs Of Beamforming Vectors 1442. The Covariance Matrix Estimates 1441 are computed by averaging the self-multiplication of the UL Channel Matrix Estimates 1440 using a matrix storing one-time computed Cross-Correlations Of Beamforming Vectors 1442 for removing redundant arithmetic operations, wherein the removing the redundant arithmetic operations includes identifying column vectors of the multi-layer precoders with ranks higher than 1 as rank-1 precoders. Processor 1402 forms the Self-Correlation Matrices For The Precoders 1443. Processor 1402 computes the Matrix Of Cross-Correlations For Pairs Of Beamforming Vectors 1442 based on component beamforming vectors of the single layer precoders, wherein multi-layer precoders of layer greater than one are formed by tiling component beamforming vectors of the single layer precoders. The implementation of the Matrix Of Cross-Correlations For Pairs Of Beamforming Vectors 1442 and the Self-Correlation Matrices For The Precoders 1443 is an alternative to the one that directly scans through all the precoders in the codebook and applies high-order matrix multiplication on each of them to obtain the Self-Correlation Matrices. The alternative implementation in these embodiments is to save computational resources in Processor 1402 because many redundant arithmetic operation supposed for multi-layer precoder are removed. Processor 1402 executes Instructions 1406 to determine the Main Diagonal Vectors Of An Inverse Of The Self-correlation Matrix 1444 of the effective channels of the multi-layer precoders. Processor 1402 executes Instructions 1406 to compute the Post-Equalized SINR Vectors multi-Layer Precoders 1445 based on the main diagonal vectors and noise power estimates. Processor 1402 computes Spectral Efficiency Estimates of the multi-Layer Precoders 1446 based on the post-equalized SINR Vectors of the Multi-Layer Precoders 1445. Processor 1402 then selects the Precoder Of Highest Spectral Efficiency Estimate 1447 for a next transmission by the UE. Processor 1402 determines the Precoder having the Highest Spectral Efficiency Estimate 1447 by scanning through the precoders in the Codebook 1424 to compute Spectral Efficiency Estimates 1446 including computing, for a hypothesized precoder of rank r, a vector of r estimates of Post-Equalized SINR 1445 based on an assumption of zero-forcing equalization at Receiver 1413, and mapping the estimate of Post-Equalized SINR Vectors 1445 for a hypothesized precoder to a metric of spectral efficiency, the map from SINR Values 1445 to Spectral Efficiency Estimate Values 1446 depending on a quality of Receiver 1413 of Network Interface 1412. Processor 1402 updates the map from controlled measurements. Processor 1402 uses the Precoder of Highest Spectral Efficiency Estimate 1447 to determine TPMI 1448 as the Precoder Index to instruct the UE to construct the precoder for the Next Uplink Transmission 1448. Processor 1402 executes Instructions 1406 stored on the one or more Non-Transitory, Computer-Readable Storage Medium 1404 to present Precoder Index Derivations 1434 on UI 1432 of Display 1430. Processor 1402 causes Precoder Indexes For A Next Uplink Transmission 1438 to be presented on UI 1432.

Embodiments described herein provide a method that provides one or more advantages. For example, according to at least one embodiment, a low computationally complexity method is provided for deriving TPMI for identifying a precoding matrix to apply for uplink transmission. Redundant arithmetic operations are removed by exploiting 3GPP NR codebook structure. Uplink capacity is increased through application of a precoding matrix identified by the TPMI for transmission between a BS and UEs. The method according to at least one embodiment provides a rigorous solution for deriving TPMI by following clear steps of predictable computation resource consumption. According to at least one embodiment, the matrix of cross-correlations of beamforming vectors is computed and the entities in the matrix of cross-correlations of beamforming vectors are mapped to the self-correlations for the hypothesis of the precoders in a codebook. The elements in the main diagonal of the inverse of a self-correlation matrix is used to produce estimates of post-equalized SINRs, which are then converted to spectral efficiency evaluation metrics. Although there are several other approaches to estimate the spectral efficiency from an effective channel matrix, the method described in embodiments described herein has lower complexity due to the fact that only the main diagonal elements in inverse matrices are used, while other off-diagonal elements are omitted. This leads to a saving of computational operations and instructions.

An aspect of this description is directed to a method [1] for deriving a precoder index from a precoder codebook includes receiving, at a Base Station (BS), a plurality of uplink channel matrix estimates from a User Equipment (UE), processing the plurality of uplink channel matrix estimates to determine spectral efficiency estimates corresponding to precoders in a codebook, and selecting, for a next transmission by the UE, an indicator of a precoder having a highest spectral efficiency estimate.

The method described in [1], wherein the receiving, at the BS, the plurality of uplink channel matrix estimates from the UE includes receiving the plurality of uplink channel matrix estimates based on Sounding Reference Signals (SRS) and noise power estimates.

The method described in any of [1] to [2], wherein the processing the plurality of uplink channel matrix estimates to determine the spectral efficiency estimates corresponding to precoders in a codebook includes determining an estimate of a covariance matrix for the uplink transmission channel using the plurality of uplink channel matrix estimates, determining a cross-correlation matrix based on component beamforming vectors of the single layer precoders, wherein multi-layer precoders of layer greater than one are formed by tiling component beamforming vectors of the single layer precoders, forming self-correlation matrices of effective channels for the multi-layer precoders, determining main diagonal vectors of an inverse of the self-correlation matrices of the effective channels for the multi-layer precoders, determining post-equalized SINR vectors for the multi-layer precoders based on the main diagonal vectors and noise power estimates, and determining the spectral efficiency estimates for the multi-layer precoders based on the post-equalized SINR vectors of the multi-layer precoders.

The method described in any of [1] to [3], wherein the determining the estimate of the covariance matrix for the uplink transmission channel using the plurality of uplink channel matrix estimates includes estimating a single channel covariance matrix from the plurality of uplink channel matrix estimates for different subcarriers across a bandwidth of SRS signals received from the UE.

The method described in any of [1] to [4], wherein the selecting, for the next transmission by the UE, the indicator of the precoder having the highest spectral efficiency estimate includes selecting, for transmission by the UE, a rank and precoder index of the precoder having the highest spectral efficiency estimate from spectral efficiency estimates of the precoders in the codebook.

The method described in any of [1] to [5], wherein the determining the estimate of the covariance matrix for the uplink transmission channel using the plurality of uplink channel matrix estimates includes computing the estimate of the covariance matrix by averaging the self-multiplication of the UL channel matrix estimates.

The method described in any of [1] to [6], wherein the computing the estimates of the covariance matrix by averaging the self-multiplication of the UL channel matrix estimates includes using a matrix storing one-time computed cross-correlations of beamforming vectors for removing redundant arithmetic operations, wherein the removing the redundant arithmetic operations includes identifying column vectors of the precoders with ranks higher than 1 as rank-1 precoders.

An aspect of this description is directed to a Base Station (BS) [8], including a memory storing computer-readable instructions, and a processor connected to the memory, wherein the processor is configured to execute the computer-readable instructions to perform operations to receive a plurality of uplink channel matrix estimates from a User Equipment (UE), process the plurality of uplink channel matrix estimates to determine spectral efficiency estimates corresponding to precoders in a codebook, and select, for a next transmission, an indicator of a precoder having a highest spectral efficiency estimate.

The BS described in [8], wherein the processor is further configured to receive the plurality of uplink channel matrix estimates from the UE by receiving the plurality of uplink channel matrix estimates based on Sounding Reference Signals (SRS) and noise power estimates.

The BS described in any of [8] to [9], wherein the processor is further configured to process the plurality of uplink channel matrix estimates to determine the spectral efficiency estimates corresponding to the precoders in the codebook by determining an estimate of a covariance matrix for the uplink transmission channel using the plurality of uplink channel matrix estimates, determining a cross-correlation matrix based on component beamforming vectors of the single layer precoders, wherein multi-layer precoders of layer greater than one are formed by tiling component beamforming vectors of the single layer precoders, forming self-correlation matrices of effective channels for the multi-layer precoders, determining main diagonal vectors of an inverse of the self-correlation matrices of the effective channels for the multi-layer precoders, determining post-equalized SINR vectors for the multi-layer precoders based on the main diagonal vectors and noise power estimates, and determining the spectral efficiency estimates for the multi-layer precoders based on the post-equalized SINR vectors of the multi-layer precoders.

The BS described in any of [8] to [10], wherein the processor is further configured to determine the estimate of the covariance matrix for the uplink transmission channel using the plurality of uplink channel matrix estimates includes estimating a single channel covariance matrix from the plurality of uplink channel matrix estimates for different subcarriers across a bandwidth of SRS signals received from the UE.

The BS described in any of [8] to [11], wherein the processor is further configured to select, for the next transmission, the indicator of the precoder having the highest spectral efficiency estimate includes selecting, for transmission, a rank and precoder index of the precoder having the highest spectral efficiency estimate from the spectral efficiency estimates of the precoders in the codebook.

The BS described in any of [8] to [12], wherein the processor is further configured to determine the estimate of the covariance matrix for the uplink transmission channel using the plurality of uplink channel matrix estimates includes computing the estimate of the covariance matrix by averaging the self-multiplication of the UL channel matrix estimates.

The BS described in any of [8] to [13], wherein the processor is further configured to compute the estimates of the covariance matrix by averaging the self-multiplication of the UL channel matrix estimates includes using a matrix storing one-time computed cross-correlations of beamforming vectors for removing redundant arithmetic operations, wherein the removing the redundant arithmetic operations includes identifying column vectors of the precoders with ranks higher than 1 as rank-1 precoders.

An aspect of this description is directed to a non-transitory computer-readable media having computer-readable instructions stored thereon [15], which when executed by a processor causes the processor to perform operations including receiving, at a Base Station (BS), a plurality of uplink channel matrix estimates from a User Equipment (UE), processing the plurality of uplink channel matrix estimates to determine spectral efficiency estimates corresponding to precoders in a codebook, and selecting, for a next transmission by the UE, an indicator of a precoder having a highest spectral efficiency estimate.

The non-transitory computer-readable media described in [15], wherein the receiving, at the BS, the plurality of uplink channel matrix estimates from the UE includes receiving the plurality of uplink channel matrix estimates based on Sounding Reference Signals (SRS) and noise power estimates.

The non-transitory computer-readable media described in any of to [16], wherein the processing the plurality of uplink channel matrix estimates to determine the spectral efficiency estimates corresponding to precoders in a codebook includes determining an estimate of a covariance matrix for the uplink transmission channel using the plurality of uplink channel matrix estimates, determining a cross-correlation matrix based on component beamforming vectors of the single layer precoders, wherein multi-layer precoders of layer greater than one are formed by tiling component beamforming vectors of the single layer precoders, forming self-correlation matrices of effective channels for the multi-layer precoders, determining main diagonal vectors of an inverse of the self-correlation matrices of the effective channels for the multi-layer precoders, determining post-equalized SINR vectors for the multi-layer precoders based on the main diagonal vectors and noise power estimates, and determining the spectral efficiency estimates for the multi-layer precoders based on the post-equalized SINR vectors of the multi-layer precoders.

The non-transitory computer-readable media described in any of to [17], wherein the determining the estimate of the covariance matrix for the uplink transmission channel using the plurality of uplink channel matrix estimates includes estimating a single channel covariance matrix from the plurality of uplink channel matrix estimates for different subcarriers across a bandwidth of SRS signals received from the UE.

The non-transitory computer-readable media described in any of to [18], wherein the selecting, for the next transmission by the UE, the indicator of the precoder having the highest spectral efficiency estimate includes selecting, for transmission by the UE, a rank and precoder index of the precoder having the highest spectral efficiency estimate from spectral efficiency estimates of the precoders in the codebook.

The non-transitory computer-readable media described in any of to [19], wherein the determining the estimate of the covariance matrix for the uplink transmission channel using the plurality of uplink channel matrix estimates includes computing the estimate of the covariance matrix by averaging the self-multiplication of the UL channel matrix estimates, wherein the computing the estimates of the covariance matrix by averaging the self-multiplication of the UL channel matrix estimates includes using a matrix storing one-time computed cross-correlations of beamforming vectors for removing redundant arithmetic operations, wherein the removing the redundant arithmetic operations includes identifying column vectors of the precoders with ranks higher than 1 as rank-1 precoders. Separate instances of these programs are able to be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above are able to be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for deriving a precoder index from a precoder codebook, comprising:

receiving, at a Base Station (BS), a plurality of uplink channel matrix estimates from a User Equipment (UE);

processing the plurality of uplink channel matrix estimates to determine spectral efficiency estimates corresponding to precoders in a codebook, wherein the spectral efficiency estimates are based on estimates of post-equalized Signal to Interference & Noise Ratios (SINRs) that are converted to the spectral efficiency estimates corresponding to multi-layer precoders in the codebook; and selecting, for a next transmission by the UE, an indicator of multi-layer precoders having a highest spectral efficiency estimate.

2. The method of claim 1, wherein the receiving, at the BS, the plurality of uplink channel matrix estimates from the UE includes receiving the plurality of uplink channel matrix estimates based on Sounding Reference Signals (SRS) and noise power estimates.

3. The method of claim 1, wherein the processing the plurality of uplink channel matrix estimates to determine the spectral efficiency estimates corresponding to the precoders in a codebook includes:

determining an estimate of a covariance matrix for an uplink transmission channel using the plurality of uplink channel matrix estimates;

determining a cross-correlation matrix based on component beamforming vectors of single layer precoders and based on the estimate of the covariance matrix, wherein multi-layer precoders of layer greater than one are formed by tiling the component beamforming vectors of the single layer precoders;

forming self-correlation matrices of effective channels for the multi-layer precoders;

determining main diagonal vectors of an inverse of the self-correlation matrices of the effective channels for the multi-layer precoders;

determining post-equalized SINR vectors for the multi-layer precoders based on the main diagonal vectors and noise power estimates; and determining the spectral efficiency estimates for the multi-layer precoders based on the post-equalized SINR vectors of the multi-layer precoders.

4. The method of claim 3, wherein the determining the estimate of the covariance matrix for the uplink transmission channel using the plurality of uplink channel matrix estimates includes estimating a single channel covariance matrix from the plurality of uplink channel matrix estimates for different subcarriers across a bandwidth of SRS signals received from the UE.

5. The method of claim 3, wherein the selecting, for the next transmission by the UE, the indicator of the multi-layer precoders having the highest spectral efficiency estimate includes selecting, for transmission by the UE, a rank and precoder index of the multi-layer precoders having the highest spectral efficiency estimate from spectral efficiency estimates of the precoders in the codebook.

6. The method of claim 3, wherein the determining the estimate of the covariance matrix for the uplink transmission channel using the plurality of uplink channel matrix estimates includes computing the estimate of the covariance matrix by averaging self-multiplication of UL channel matrix estimates.

7. The method of claim 6, wherein the computing the estimates of the covariance matrix by averaging the self-multiplication of the UL channel matrix estimates includes using a matrix storing one-time computed cross-correlations of beamforming vectors for removing redundant arithmetic operations, wherein the removing the redundant arithmetic operations includes identifying column vectors of the precoders with ranks higher than 1 as rank-1 precoders.

8. A Base Station (BS), configured to:

receive a plurality of uplink channel matrix estimates from a User Equipment (UE);

process the plurality of uplink channel matrix estimates to determine spectral efficiency estimates corresponding to precoders in a codebook, wherein the spectral efficiency estimates are based on estimates of post-equalized Signal to Interference & Noise Ratios (SINRs) that are converted to the spectral efficiency estimates corresponding to multi-layer precoders in the codebook; and select, for a next transmission, an indicator of multi-layer precoders having a highest spectral efficiency estimate.

9. The BS of claim 8, further configured to receive the plurality of uplink channel matrix estimates from the UE by receiving the plurality of uplink channel matrix estimates based on Sounding Reference Signals (SRS) and noise power estimates.

10. The BS of claim 8, further configured to process the plurality of uplink channel matrix estimates to determine the spectral efficiency estimates corresponding to the precoders in the codebook by determining an estimate of a covariance matrix for an uplink transmission channel using the plurality of uplink channel matrix estimates, determining a cross-correlation matrix based on component beamforming vectors of single layer precoders and based on the estimate of the covariance matrix, wherein multi-layer precoders of layer greater than one are formed by tiling component beamforming vectors of the single layer precoders, forming self-correlation matrices of effective channels for the multi-layer precoders, determining main diagonal vectors of an inverse of the self-correlation matrices of the effective channels for the multi-layer precoders, determining post-equalized SINR vectors for the multi-layer precoders based on the main diagonal vectors and noise power estimates, and determining the spectral efficiency estimates for the multi-layer precoders based on the post-equalized SINR vectors of the multi-layer precoders.

11. The BS of claim 10, further configured to determine the estimate of the covariance matrix for the uplink transmission channel using the plurality of uplink channel matrix estimates includes estimating a single channel covariance matrix from the plurality of uplink channel matrix estimates for different subcarriers across a bandwidth of SRS signals received from the UE.

12. The BS of claim 10, further configured to select, for the next transmission, the indicator of the multi-layer precoders having the highest spectral efficiency estimate includes selecting, for transmission, a rank and precoder index of the multi-layer precoders having the highest spectral efficiency estimate from the spectral efficiency estimates of the precoders in the codebook.

13. The BS of claim 10, further configured to determine the estimate of the covariance matrix for the uplink transmission channel using the plurality of uplink channel matrix estimates includes computing the estimate of the covariance matrix by averaging self-multiplication of UL channel matrix estimates.

14. The BS of claim 13, further configured to compute the estimates of the covariance matrix by averaging the self-multiplication of the UL channel matrix estimates includes using a matrix storing one-time computed cross-correlations of beamforming vectors for removing redundant arithmetic operations, wherein the removing the redundant arithmetic operations includes identifying column vectors of the precoders with ranks higher than 1 as rank-1 precoders.

15. A non-transitory computer-readable media having computer-readable instructions stored thereon, which when executed by a processor causes the processor to perform operations comprising:

receiving, at a Base Station (BS), a plurality of uplink channel matrix estimates from a User Equipment (UE);

processing the plurality of uplink channel matrix estimates to determine spectral efficiency estimates corresponding to precoders in a codebook, wherein the spectral efficiency estimates are based on estimates of post-equalized Signal to Interference & Noise Ratios (SINRs) that are converted to the spectral efficiency estimates corresponding to multi-layer precoders in the codebook; and selecting, for a next transmission by the UE, an indicator of multi-layer precoders having a highest spectral efficiency estimate.

16. The non-transitory computer-readable media of claim 15, wherein the receiving, at the BS, the plurality of uplink channel matrix estimates from the UE includes receiving the plurality of uplink channel matrix estimates based on Sounding Reference Signals (SRS) and noise power estimates.

17. The non-transitory computer-readable media of claim 15, wherein the processing the plurality of uplink channel matrix estimates to determine the spectral efficiency estimates corresponding to the precoders in the codebook includes:

determining an estimate of a covariance matrix for an uplink transmission channel using the plurality of uplink channel matrix estimates;

determining a cross-correlation matrix based on component beamforming vectors of single layer precoders and based on the estimate of the covariance matrix, wherein multi-layer precoders of layer greater than one are formed by tiling component beamforming vectors of the single layer precoders;

forming self-correlation matrices of effective channels for the multi-layer precoders;

determining main diagonal vectors of an inverse of the self-correlation matrices of the effective channels for the multi-layer precoders;

determining post-equalized SINR vectors for the multi-layer precoders based on the main diagonal vectors and noise power estimates; and determining the spectral efficiency estimates for the multi-layer precoders based on the post-equalized SINR vectors of the multi-layer precoders.

18. The non-transitory computer-readable media of claim 17, wherein the determining the estimate of the covariance matrix for the uplink transmission channel using the plurality of uplink channel matrix estimates includes estimating a single channel covariance matrix from the plurality of uplink channel matrix estimates for different subcarriers across a bandwidth of SRS signals received from the UE.

19. The non-transitory computer-readable media of claim 17, wherein the selecting, for the next transmission by the UE, the indicator of the multi-layer precoders having the highest spectral efficiency estimate includes selecting, for transmission by the UE, a rank and precoder index of the multi-layer precoders having the highest spectral efficiency estimate from spectral efficiency estimates of the precoders in the codebook.

20. The non-transitory computer-readable media of claim 17, wherein the determining the estimate of the covariance matrix for the uplink transmission channel using the plurality of uplink channel matrix estimates includes computing the estimate of the covariance matrix by averaging self-multiplication of UL channel matrix estimates, wherein the computing the estimate of the covariance matrix by averaging the self-multiplication of the UL channel matrix estimates includes using a matrix storing one-time computed cross-correlations of beamforming vectors for removing redundant arithmetic operations, wherein the removing the redundant arithmetic operations includes identifying column vectors of the precoders with ranks higher than 1 as rank-1 precoders.

* * * * *